(12) United States Patent
Kato

(10) Patent No.: US 10,909,059 B2
(45) Date of Patent: *Feb. 2, 2021

(54) TRANSMISSION TERMINAL, NON-TRANSITORY RECORDING MEDIUM, TRANSMISSION METHOD, AND TRANSMISSION SYSTEM

(71) Applicant: Ricoh Company, Ltd., Tokyo (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,752

(22) Filed: Oct. 16, 2019

(65) Prior Publication Data

US 2020/0050567 A1 Feb. 13, 2020

Related U.S. Application Data

(63) Continuation of application No. 15/277,069, filed on Sep. 27, 2016, now Pat. No. 10,503,676, which is a (Continued)

(30) Foreign Application Priority Data

Mar. 31, 2014 (JP) .................. 2014-071406

(51) Int. Cl.
G06F 13/36 (2006.01)
H04N 7/15 (2006.01)
G06F 13/40 (2006.01)

(52) U.S. Cl.
CPC .......... *G06F 13/36* (2013.01); *G06F 13/4068* (2013.01); *H04N 7/15* (2013.01)

(58) Field of Classification Search
CPC ........ G06F 13/36; G06F 13/4068; H04N 7/15
See application file for complete search history.

(56) References Cited

U.S. PATENT DOCUMENTS 9,131,104 B2 9/2015 Nakafuji et al.
9,307,197 B2 4/2016 Kato et al.
(Continued)

FOREIGN PATENT DOCUMENTS

JP 6-70040 A 3/1994
JP 7-203405 A 8/1995
(Continued)

OTHER PUBLICATIONS

Japanese Office Action dated Oct. 29, 2019, in Patent Application No. 2019-046881, 3 pages.
(Continued)

*Primary Examiner* — Henry Tsai
*Assistant Examiner* — John B Roche
(74) *Attorney, Agent, or Firm* — Oblon, McClelland, Maier & Neustadt, L.L.P.

(57) ABSTRACT

A transmission terminal includes at least one processor configured to transmit a terminal information request to request the number of transmission terminals under transmission to a transmission management apparatus connected via a network; and display image data received from one or more of the transmission terminals under transmission on a display device, and display the number of the transmission terminals under transmission received from the transmission management apparatus in response to the terminal information request on the display device.

6 Claims, 29 Drawing Sheets

Related U.S. Application Data continuation of application No. PCT/JP2015/060144, filed on Mar. 31, 2015.

(56) References Cited

U.S. PATENT DOCUMENTS

| 10,503,676 | B2* | 12/2019 | Kato ............... H04N 7/15 |
| 2006/0227632 | A1* | 10/2006 | Koyama ............ G06Q 30/06 |
| | | | 365/200 |
| 2009/0310601 | A1 | 12/2009 | Kawahata |
| 2012/0069132 | A1 | 3/2012 | Kato |
| 2012/0182381 | A1 | 7/2012 | Abate |
| 2012/0182384 | A1 | 7/2012 | Anderson et al. |
| 2013/0242030 | A1 | 9/2013 | Kato et al. |
| 2013/0242033 | A1* | 9/2013 | Kato ............... H04N 7/15 |
| | | | 348/14.08 |
| 2014/0111597 | A1 | 4/2014 | Anderson et al. |
| 2014/0181340 | A1 | 6/2014 | Parthasarathy |
| 2016/0088259 | A1 | 3/2016 | Anderson et al. |
| 2017/0201718 | A1 | 7/2017 | Kato et al. |

FOREIGN PATENT DOCUMENTS

| JP | 2001-313915 | 11/2001 |
| JP | 2004-187170 | 7/2004 |
| JP | 2007-025946 | 2/2007 |
| JP | 2009-302806 A | 12/2009 |
| JP | 2012-134939 A | 7/2012 |
| JP | 2012-195926 A | 10/2012 |
| JP | 2013-157995 | 8/2013 |
| JP | 2013-191954 | 9/2013 |
| JP | 2014-200063 | 10/2014 |
| WO | WO 2011/126511 A1 | 10/2011 |

OTHER PUBLICATIONS

International Search Report dated May 12, 2015 in PCT/JP2015/060144 filed on Mar. 31, 2015 (w/English translation).

Written Opinion dated May 12, 2015 in PCT/JP2015/060144 filed on Mar. 31, 2015.

Niimi, "Speech Recognition", Kyoritsu Publishing, Co., 1979, pp. 68-72.

Office Action dated Feb. 27, 2017 in European Patent Application No. 15773300.7.

Singaporean Office Action dated May 11, 2017in Singaporean Patent Application No. 11201608023X.

Office Action dated Mar. 20, 2018 in Japanese Patent Application No. 2014-111480, 3 pages.

Office Action dated Nov. 6, 2018 in corresponding Japanese Patent Application No. 2018-128035, 3 pages.

Decision to Refuse a European Application dated Jul. 21, 2020 in European Application No. 15 773 300.7.

* cited by examiner

FIG.8

| TERMINAL ID | PASSWORD |
|---|---|
| 01aa | aaaa |
| 01ab | abab |
| 01ba | baba |
| ... | ... |

| TERMINAL ID | DESTINATION NAME | OPERATIONAL STATUS | RECEIVED DATE AND TIME | TERMINAL IP ADDRESS |
|---|---|---|---|---|
| 01aa | JAPAN TOKYO OFFICE AA TERMINAL | ONLINE (TRANSMISSION POSSIBLE) | 2009.11.10 10:13:40 | 1.2.1.3 |
| 01ab | JAPAN TOKYO OFFICE AB TERMINAL | OFFLINE | 2009.11.09 12:00 | 1.2.1.4 |
| ... | ... | ... | ... | ... |
| 01ba | JAPAN OSAKA OFFICE BA TERMINAL | ONLINE (TRANSMISSION POSSIBLE) | 2009.11.10 10:13:45 | 1.2.2.3 |
| 01bb | JAPAN OSAKA OFFICE BB TERMINAL | ONLINE (TRANSMISSION POSSIBLE) | 2009.11.10 10:13:50 | 1.2.2.4 |
| ... | ... | ... | ... | ... |
| 01ca | USA NEW YORK OFFICE CA TERMINAL | OFFLINE | 2009.11.10 12:45 | 1.3.1.3 |
| 01cb | USA NEW YORK OFFICE CB TERMINAL | ONLINE (UNDER TRANSMISSION) | 2009.11.10 10:13:55 | 1.3.1.4 |
| ... | ... | ... | ... | ... |
| 01da | USA WASHINGTON OFFICE DA TERMINAL | OFFLINE | 2009.11.08 12:45 | 1.3.2.3 |
| 01db | USA WASHINGTON OFFICE DB TERMINAL | ONLINE (UNDER TRANSMISSION) | 2009.11.10 12:45 | 1.3.2.4 |
| ... | ... | ... | ... | ... |

| TERMINAL ID | DESTINATION NAME | OPERATIONAL STATUS | RECEIVED DATE AND TIME | TERMINAL IP ADDRESS |
|---|---|---|---|---|
| 01aa | JAPAN TOKYO OFFICE AA TERMINAL | ONLINE (UNDER TRANSMISSION) | 2009.11.10 13:40 | 1.2.1.3 |
| 01ab | JAPAN TOKYO OFFICE AB TERMINAL | OFFLINE | 2009.11.09 12:00 | 1.2.1.4 |
| ... | ... | ... | ... | ... |
| 01ba | JAPAN OSAKA OFFICE BA TERMINAL | ONLINE (TRANSMISSION POSSIBLE) | 2009.11.10 13:45 | 1.2.2.3 |
| 01bb | JAPAN OSAKA OFFICE BB TERMINAL | ONLINE (TRANSMISSION POSSIBLE) | 2009.11.10 13:50 | 1.2.2.4 |
| ... | ... | ... | ... | ... |
| 01ca | USA NEW YORK OFFICE CA TERMINAL | OFFLINE | 2009.11.10 12:45 | 1.3.1.3 |
| 01cb | USA NEW YORK OFFICE CB TERMINAL | ONLINE (UNDER TRANSMISSION) | 2009.11.10 13:55 | 1.3.1.4 |
| ... | ... | ... | ... | ... |
| 01da | USA WASHINGTON OFFICE DA TERMINAL | OFFLINE | 2009.11.08 12:45 | 1.3.2.3 |
| 01db | USA WASHINGTON OFFICE DB TERMINAL | ONLINE (UNDER TRANSMISSION) | 2009.11.10 12:45 | 1.3.2.4 |
| ... | ... | ... | ... | ... |

| REQUESTING TERMINAL ID | DESTINATION TERMINAL ID | 5004T |
|---|---|---|
| 01aa | 01ab,01ba,01db | |
| 01ab | 01aa,01ca,01cb | |
| 01ba | 01aa,01ab,01ca,01cb,01da,01db | |
| ... | ... | |
| 01db | 01aa,01ab,01ba,···,01da,01ca,01cb,···,01da | |

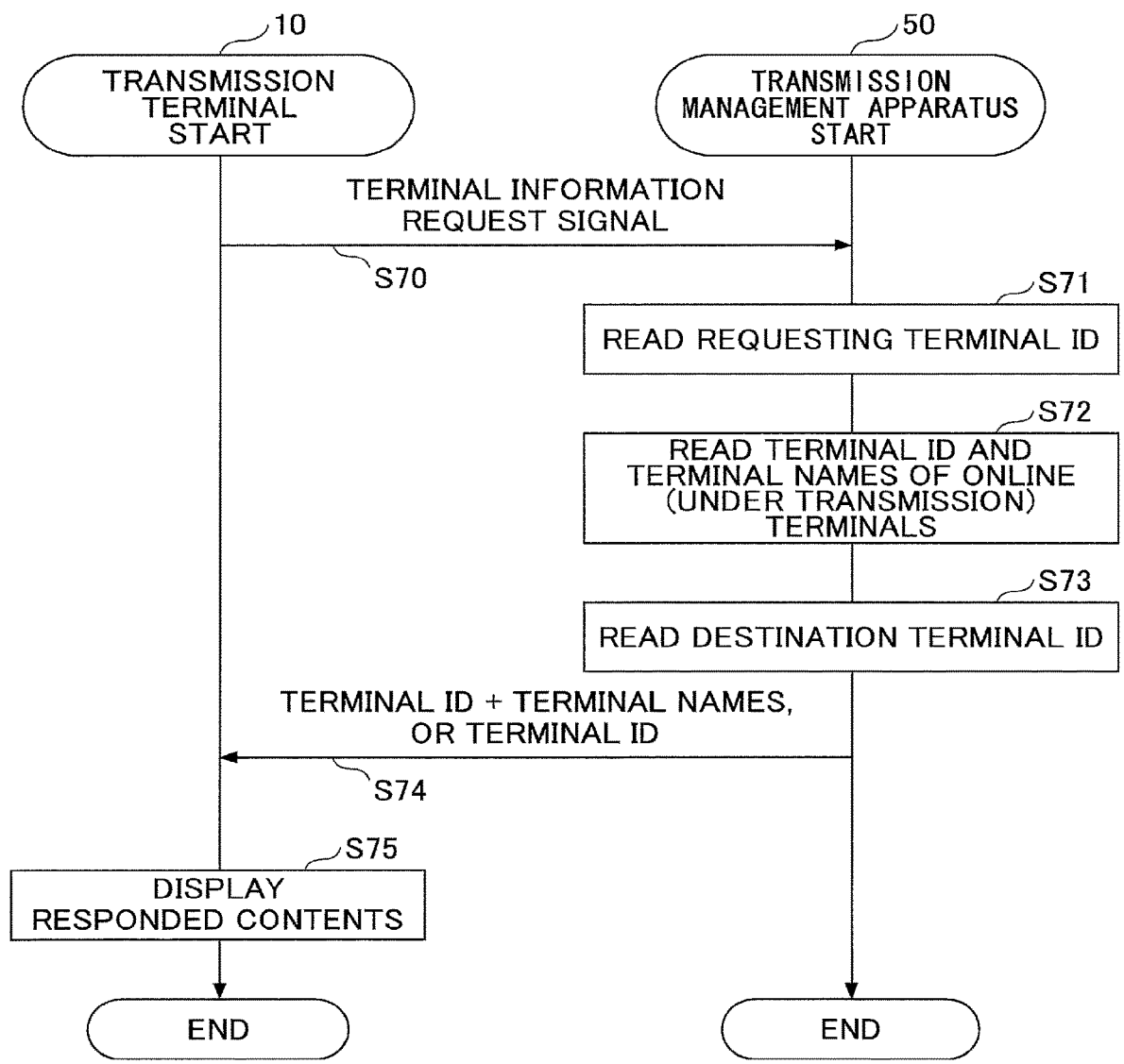

TRANSMISSION TERMINAL, NON-TRANSITORY RECORDING MEDIUM, TRANSMISSION METHOD, AND TRANSMISSION SYSTEM

CROSS-REFERENCE TO APPLICATIONS

This application is a continuation of and claims the benefit of priority under 35 U.S.C. § 120 from U.S. application Ser. No. 15/277,069 filed Sep. 27, 2016, which is a continuation of prior International Application No. PCT/JP2015/060144 filed Mar. 31, 2015, which claims the benefit of priority under 35 U.S.C. § 119 from Japanese Patent Application No. 2014-071406 filed Mar. 31, 2014, the entire contents of each of which are incorporated herein by reference. Also, the contents of Japanese Patent Application No. 2014-111480 filed May 29, 2014 is incorporated herein by reference in its entirety.

BACKGROUND

1. Technical Field

The present invention relates to a transmission terminal, a non-transitory recording medium, a transmission method, and a transmission system.

2. Description of the Related Art

In a video conference system, a transmission terminal acquires an image and a sound by taking an image and acquiring a statement of a participant of the video conference, and transmits the acquired image and sound to a destination transmission terminal. The destination transmission terminal displays the image using a display or a projector connected to the destination transmission terminal, and outputs the sound from a speaker. Thus, it is possible for respective remote participants to carry out a conference in a condition similar to an actual conference.

In such a remote conference system, the number of transmission terminals that participate in a conference is not limited to 2, and, it is possible to implement a video conference among many bases by using all the transmission terminals that participate in the conference.

Generally speaking, in a video conference carried out among many bases, a participant who will participate in the conference using a transmission terminal wishes to know who in a remote place has participated in the conference. Therefore, each transmission terminal divides an image area of a display of the transmission terminal into divisions corresponding to transmission terminals which have participated in the video conference, and displays participants in the respective division image areas transmitted from the corresponding transmission terminals.

A transmission terminal that has an image mode where information of transmission terminals that have participated in a video conference is displayed in addition to an image mode where images transmitted from the other transmission terminals are displayed is known (for example, see Japanese Unexamined Patent Application No. 2013-157995).

Also, there is a disclosure on 68-72 pages of a document "Voice Recognition", written by Yasunaga Niimi, published by Kyoritsu Shuppan Co., Ltd., 1979.

SUMMARY

According to one aspect, a transmission terminal includes at least one processor that is configured to transmit a terminal information request to request the number of transmission terminals under transmission to a transmission management apparatus connected via a network; and display image data received from one or more of the transmission terminals under transmission on a display device, and display the number of the transmission terminals under transmission received from the transmission management apparatus in response to the terminal information request on the display device.

Other objects, features, and advantages will become more apparent from the following detailed description when read in conjunction with the accompanying drawings.

BRIEF DESCRIPTION OF THE DRAWINGS

FIG. 8 is one example of a conceptual diagram of a terminal authentication management table managed by the transmission management apparatus;

FIG. 9A is one example of a conceptual diagram of a terminal management table managed by the transmission management apparatus;

FIG. 9B is one example of a conceptual diagram of a terminal management table managed by the transmission management apparatus;

FIG. 10 is one example of a conceptual diagram of a terminal management table managed by the transmission management apparatus;

FIG. 16 is a sequence diagram illustrating a terminal information displaying operation of displaying terminal information in a terminal information display area when a transmission terminal has switched a display mode into the information display mode;

DETAILED DESCRIPTION OF EMBODIMENTS

In a transmission terminal disclosed in Japanese Unexamined Patent Application No. 2013-157995, switching is carried out between an image mode where images transmitted from the other transmission terminals are displayed and an image mode where information of transmission terminals that have participated in a video conference is displayed. Therefore, for example, in the image mode where images transmitted from the other transmission terminals are displayed, it is impossible to acquire the information of transmission terminals acquirable in the image mode where the information of transmission terminals that have participated in a video conference is displayed.

In consideration of the problem, an object is to provide a transmission terminal with which it is possible to know information of other bases even in an image mode where images from transmission terminals are displayed.

Figure 1:
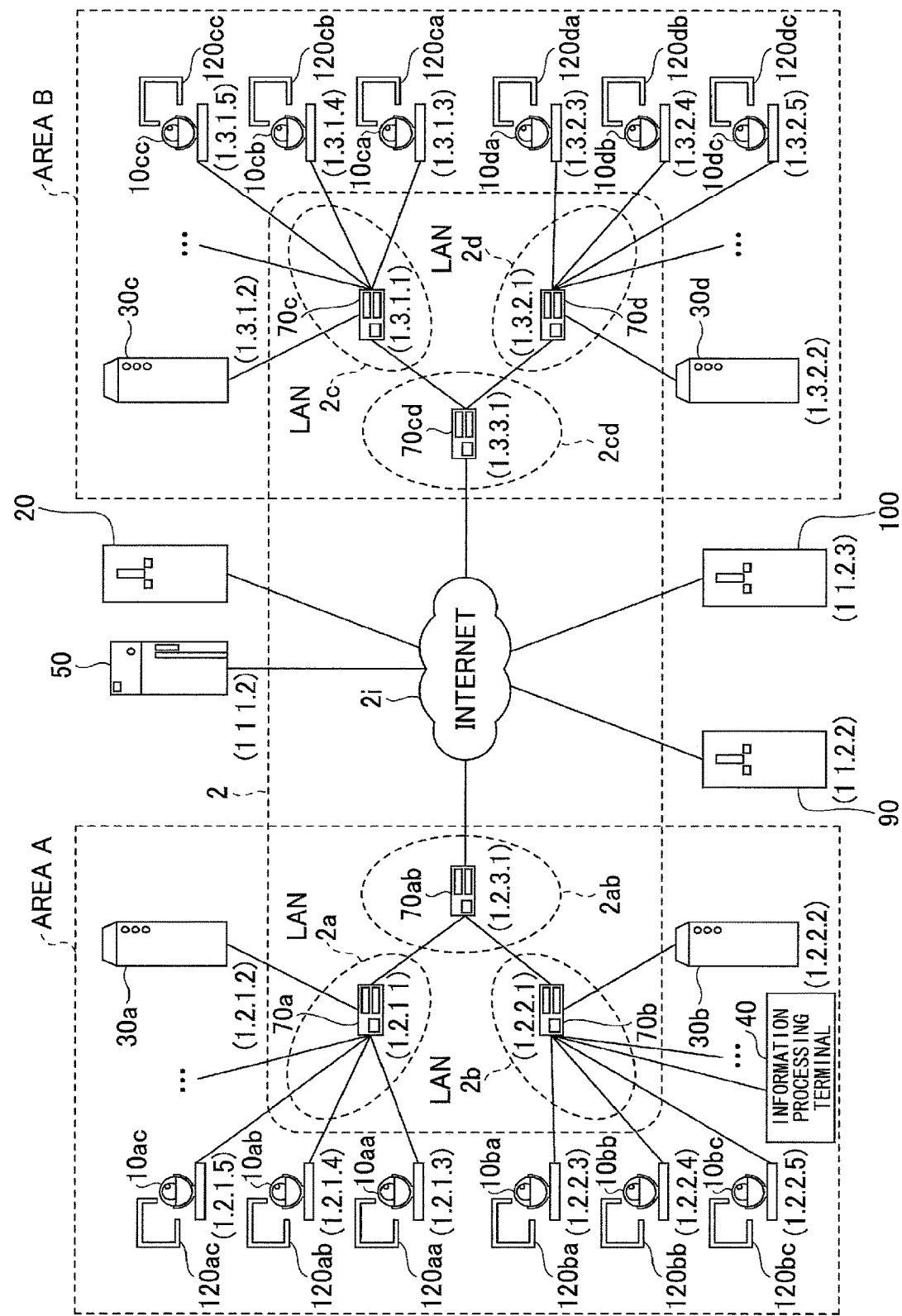
FIG. 1 generally illustrates one example of a transmission system 1.
Figure 2:
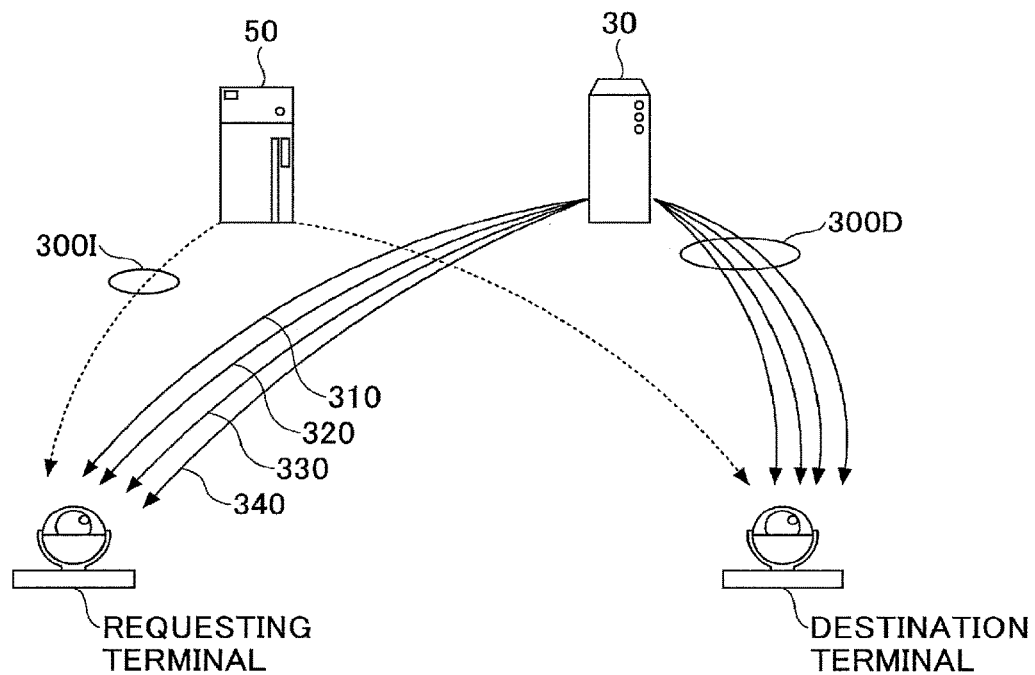
FIG. 2 is a conceptual diagram illustrating one example of a state where, in the transmission system, image data, sound data, and various sorts of management information are transmitted and received.
Figure 3:
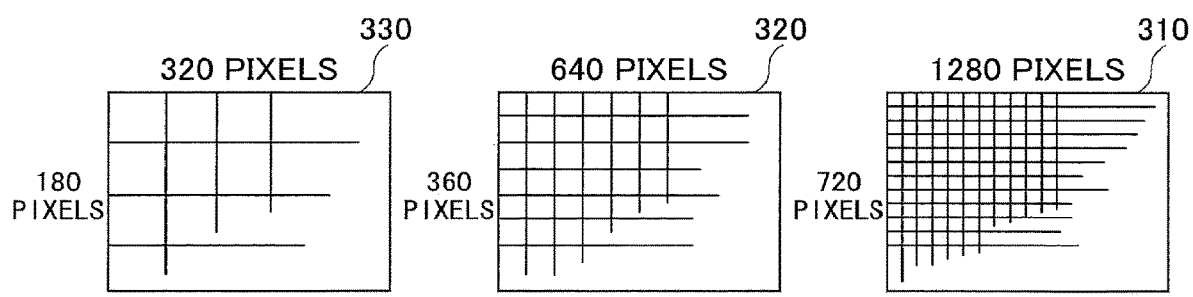
FIG. 3 is a conceptual diagram illustrating image quality of image data.

Below, embodiments of the present invention will be described with reference to the drawings. FIG. 1 generally illustrates a transmission system 1 according to an embodiment of the present invention. FIG. 2 is a conceptual diagram illustrating a state where, in the transmission system 1, image data, sound data, and various sorts of management information are transmitted and received. FIG. 3 is a conceptual diagram illustrating image quality of image data.

The transmission system 1 may be a data providing system that unidirectionally transmits content data from one transmission terminal to a plurality of transmission terminals via a transmission management apparatus 50, or a communication system that transmits information, feelings, and so forth, mutually between a plurality of transmission terminals via a transmission management apparatus 50. The communication system may be a system that transmits information, feelings, and so forth, mutually between a plurality of communication terminals (corresponding to "transmission terminals") via a communication management apparatus (corresponding to a "transmission management apparatus"), and thus, for example, may be a video conference system, a video phone system, or the like.

Concerning the present embodiment, the transmission system 1, a transmission management apparatus 50, and transmission terminals 10 will be described, assuming a video conference system as one example of a communication system, assuming a video conference management apparatus as one example of a communication management apparatus, and assuming video conference terminals as examples of communication terminals. That is, the transmission terminals and the transmission management apparatus 50 according to the present invention can be applied not only to a video conference system but also to a communication system, or a data transmission system.

As illustrated in FIG. 1, the transmission system 1 includes a plurality of the transmission terminals 10aa, 10ab, and so forth, displays 120aa, 120ab, and so forth of the respective transmission terminals 10aa, 10ab, and so forth, a UI providing apparatus 20, an information processing terminal 40, relay apparatuses 30a, 30b, 30c, and 30d, the transmission management apparatus 50, and a program providing apparatus 90. The transmission terminals 10aa, 10ab, and so forth, transmit and receive, for example, image data and sound data, as content data.

Note that, hereinafter, any one of the transmission terminals 10aa, 10ab, and so forth, may be referred to as a "transmission terminal 10", and any one of the displays 120aa, 120ab, and so forth, may be referred to as a "display 120". A transmission terminal that requests to start a video conference may be referred to as a "requesting terminal", and a transmission terminal which is thus requested may be referred to as a "destination terminal". Also, any one of the relay apparatuses 30a through 30d may be referred to as a "relay apparatus 30".

Also, transmission terminals 10 that have participated in a video conference or places where the terminals 10 are located will be referred to as "bases". The number of bases is the same as the number of transmission terminals 10 that have participated in the video conference. However, there may be a plurality of terminals 10 in a space that can be regarded as a single place (for example, a single conference room).

The UI providing apparatus 20 transmits layout information (described later), mainly for displaying the number of bases, to transmission terminals 10. For example, the transmission management apparatus 50 or a relay apparatus 30 may function as the UI providing apparatus 20 in addition to the original function of the transmission management apparatus 50 or the relay apparatus 30 itself.

Also, the information processing terminal 40 is an apparatus where the function of a transmission terminal 10 is implemented by software. Actually, the information processing terminal 40 is implemented in a configuration of, for example, a PC (Personal Computer), a tablet-type terminal, a smartphone, a cell phone, a PDA (Personal Digital Assistant), an electronic book reading terminal, or the like.

As illustrated in FIG. 2, in the transmission system 1, a management information session 3001 for transmitting and receiving various sorts of management information is established between a requesting terminal and a destination terminal via the transmission management apparatus 50.

Also, between a requesting terminal and a destination terminal between which a management information session 3001 is established, 4 respective sessions are established for transmitting and receiving, via a relay apparatus 30, 4 types of data, i.e., high resolution image data 310, medium resolution image data 320, low resolution image data 330, and sound data 340. Note that in the present embodiment, the 4 sessions will be referred to as an "image and sound data session 300D" as a whole.

Image data processed in the present embodiment is scalably encoded. For example, image data processed in the present embodiment includes low resolution image data 330, medium resolution image data 320, and high resolution image data 310. As illustrated in FIG. 3, low resolution image data 330 has a resolution such as 320 pixels (horizontal direction) by 180 pixels (vertical direction), medium resolution image data 320 has a resolution such as 640 pixels (horizontal direction) by 360 pixels (vertical direction), and high resolution image data 310 has a resolution such as 1280 pixels (horizontal direction) by 720 pixels (vertical direction).

If a band to transmit image data is narrow, low resolution image data 330 as a base image is transmitted, and a transmission terminal 10 on the reception side can display an image of low image quality based on the transmitted low resolution image data 330.

If a band to transmit image data is relatively wide, low resolution image data 330 as a base image and medium resolution image data 320 are transmitted, and a transmission terminal 10 on the reception side can display an image of medium image quality based on the transmitted low resolution image data 330 and the medium resolution image data 320.

If a band to transmit image data is very wide, low resolution image data 330 as a base image, medium resolution image data 320, and high resolution image data 310 are transmitted, and a transmission terminal 10 on the reception side can display an image of high image quality based on the transmitted low resolution image data 330, the medium resolution image data 320, and the high resolution image data 310.

In FIG. 1, a relay apparatus 30 relays content data between a plurality of transmission terminals 10. The transmission management apparatus 50 unitarily manages login authentication requested by transmission terminals 10, transmission statuses of transmission terminals 10, a destination list, a transmission situations in relay apparatuses 30, and so forth. Note that an image expressed by image data may be a moving image or a static image, or both a moving image and a static image.

A plurality of routers 70a, 70b, 70c, 70d, 70ab, and 70cd select optimum routes of image data and sound data. Note that hereinafter, any one of the routers 70a, 70b, 70c, 70d, 70ab, and 70cd may be referred to as a "router 70".

The program providing apparatus 90 includes a hard disk (HD) 204 (FIG. 6), stores a transmission terminal control program 1000a (FIG. 7) to implement various functions of transmission terminals 10, and can transmit the transmission terminal control programs 1000a to the transmission terminals 10.

Also, in the HD204 of the program providing apparatus 90, a relay apparatus program to implement various functions of a relay apparatus 30 is stored, and the program providing apparatus 90 can transmit the relay apparatus programs to the relay apparatuses 30.

Also, in the HD204 of the program providing apparatus 90, a transmission management program to implement various functions of the transmission management apparatus 50 is stored, and the program providing apparatus 90 can transmit the transmission management program to the transmission management apparatus 50.

Also, in the HD204 of the program providing apparatus 90, a UI providing apparatus program to implement various functions of the UI providing apparatus 20 is stored, and the program providing apparatus 90 can transmit the UI providing apparatus program to the UI providing apparatus 20.

Also, in the HD204 of the program providing apparatus 90, an information processing terminal program to implement various functions of the information processing terminal 40 is stored, and the program providing apparatus 90 can transmit the information processing terminal program to the information processing terminal 40.

The transmission terminals 10aa, 10ab, 10ac, and so forth, and the router 70a are connected together via a local area network (LAN) 2a in a manner to enable data transmission. The transmission terminal 10ba, 10bb, 10bc, and so forth, and the router 70b are connected together via a LAN 2b in a manner to enable data transmission.

The LANs 2a and 2b are connected together via a private line tab that includes the router 1ab, in a manner to enable data transmission, and are installed in a certain area A. For example, the area A is Japan, the LAN 2a is installed in a Tokyo office, and the LAN 2b is installed in an Osaka office.

The transmission terminal 10ca, 10cb, 10cc, and so forth, and the router 70c are connected together via a LAN 2c in a manner to enable data transmission. The transmission terminal 10da, 10db, 10dc, and so forth, and the router 70d are connected together via a LAN 2d in a manner to enable data transmission.

The LANs 2c and 2d are connected together via a private line 2cd that includes the router 7cd, in a manner to enable data transmission, and are installed in a certain area B. For example, the area B is USA, the LAN 2c is installed in a New York office, and the LAN 2d is installed in a Washington office. The areas A and B are connected together via the Internet using the routers 70ab and 70cd, respectively, in a manner to enable data transmission therebetween.

Also, the relay apparatuses 30, the transmission management apparatus 50, the UI providing apparatus 20, the information processing terminal 40, and the program providing apparatus 90 are connected to the respective transmission terminals 10 via the Internet 2i in a manner to enable data transmission. The relay apparatuses 30, the transmission management apparatus 50, the UI providing apparatus 20, the information processing terminal 40, and the program providing apparatus 90 may be installed in the area A or the area B, or in an area other than the areas A and B.

Note that according to the present embodiment, the transmission network 2 includes the LANs 2a and 2b, the private line 2ab, the Internet 2i, the private line 2cd, and the LANs 2c and 2d. The transmission network 2 may include not only zones where wired transmission is carried out, but also zones where wireless transmission is carried out through WiFi (Wireless Fidelity), Bluetooth (registered trademark), or the like.

Also, in FIG. 1, the 4 digit figures indicated below each of the transmission terminals 10, the relay apparatuses 30, the transmission management apparatus 50, the routers 70, the UI providing apparatus 20, the information processing terminal 40, and the program providing apparatus 90 simply express an IP address in a general IPv4. For example, the IP address of the transmission terminal 10aa is "1.2.1.3". Instead of IPv4, IPv6 may be used. However, for the sake of simplification of description, description will be made using IPv4.

Note that the respective transmission terminals 10 may be used not only for a video conference among a plurality offices or among a plurality of rooms in the same office, but also for a video conference in the same room, or a video conference between an outdoor place and an indoor place, or between an outdoor place and another outdoor place. If the respective transmission terminals 10 are used outdoor, transmission is carried out wirelessly through a cell phone network or the like.

Figure 4:
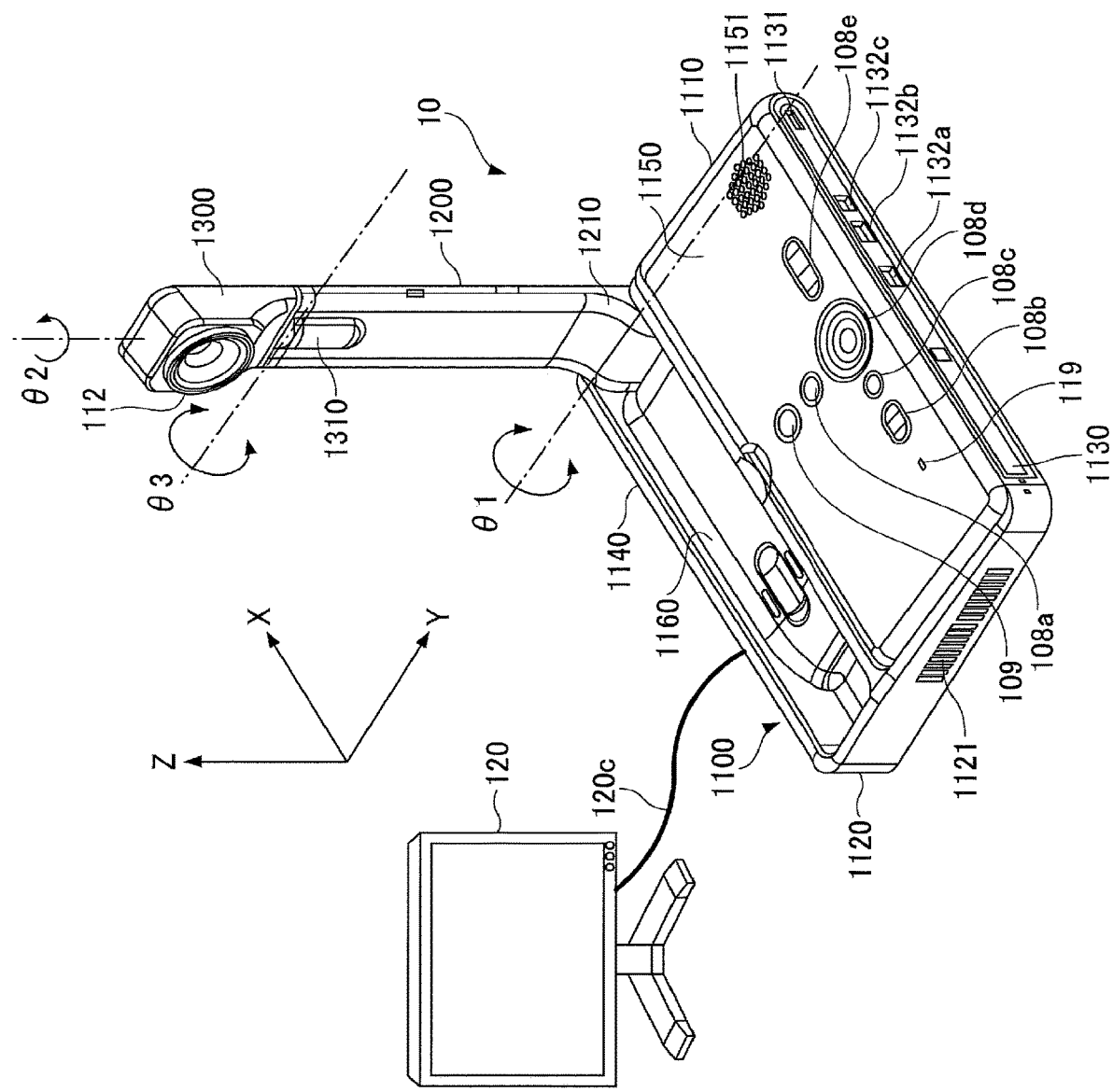
FIG. 4 is one example of an outline view of a transmission terminal.

FIG. 4 is an outline view of a transmission terminal 10. Below, description will be made assuming the longitudinal direction of the transmission terminal 10 as an X-axis direction, a direction perpendicular to the X-axis direction on a horizontal plane as a Y-axis direction, and a direction (vertical direction) perpendicular to the X-axis direction and the Y-axis direction as a Z-axis direction.

As illustrated in FIG. 4, a transmission terminal 10 includes a housing 1100, an arm 1200, and a camera housing 1300. A front wall 1110 of the housing 1100 has an air suction surface (not illustrated) that includes air suction holes, and a rear wall 1120 of the housing 1100 has an air ejection surface 1121 that includes air ejection holes. Thereby, as a result of a cooling fan included in the housing 1100 being driven, an external air can be suctioned through the suction surface from the front side of the transmission terminal 10, and the suctioned air can be ejected to the rear side of the transmission terminal 10 through the air ejection surface 1121. The right wall 1130 of the housing 1100 has a sound collection hole 1131 through which, by a built-in-type microphone 114 (FIG. 5) described later, voices, sounds, noises, and so forth can be collected.

Figure 5:
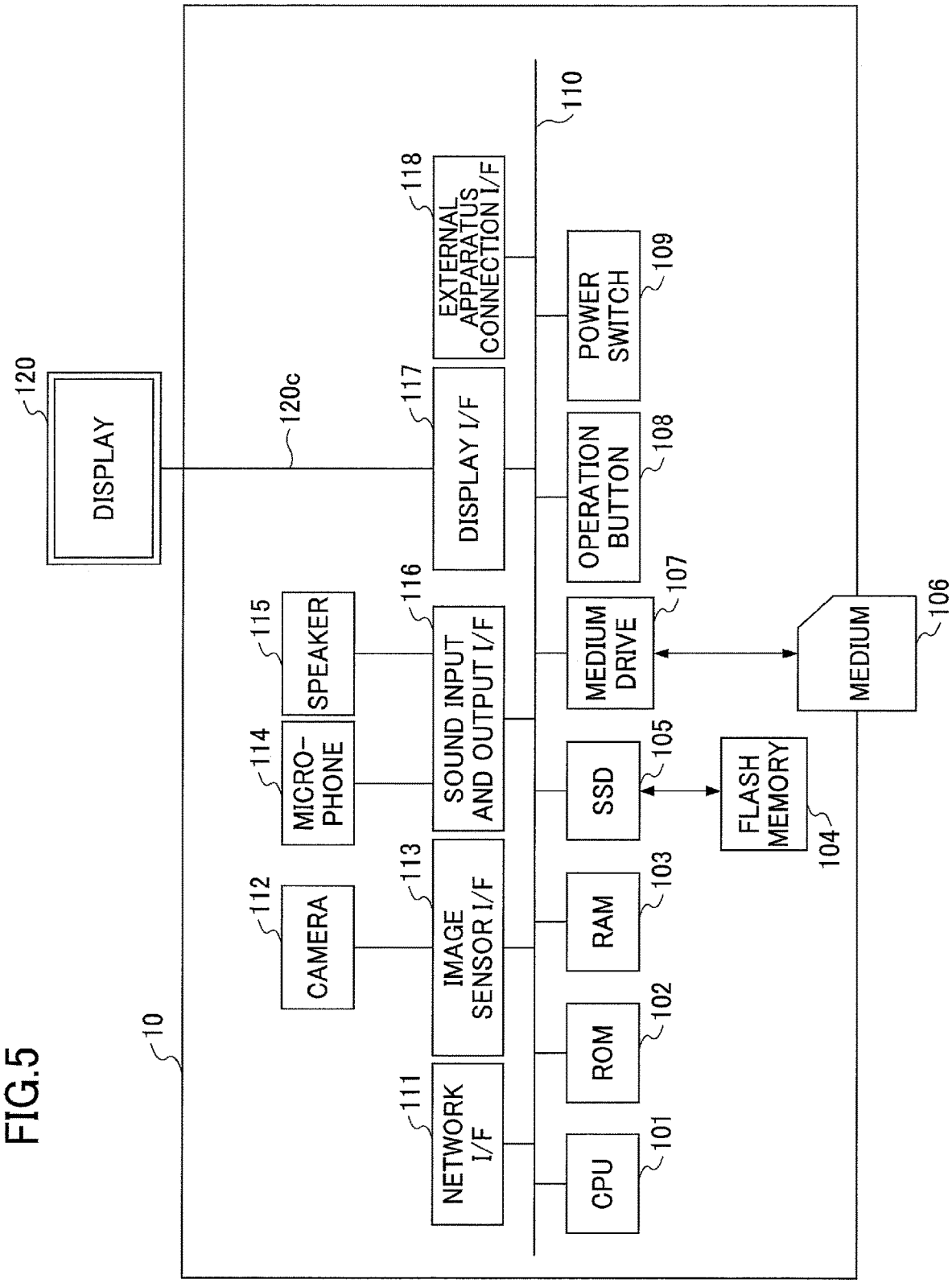
FIG. 5 illustrates one example of a hardware configuration of the transmission terminal.

At a side of the housing 1100 near the right wall 1130, an operation panel 1150 is formed. The operation panel 1150 has a plurality of operation buttons 108a through 108e, a power switch 109, and an alarm lamp 119, and also, has a sound output surface 1151 that includes sound output holes through which sounds that are output from a built-in-type speaker 115 (FIG. 5) pass. At a side of the housing 1100 near the left wall 1140, an accommodation section 1160 as a recess to accommodate the arm 1200 and the camera housing 1300 is formed. The right wall 1130 of the housing 1100 has connection holes 1132a through 1132c for eclectically connecting cables to an external apparatus connection interface (I/F) 118 (FIG. 5). The left wall 1140 of the housing 1100 has a connection hole (not illustrated) for electrically connecting a cable 120c for the external apparatus connection I/F 118 for the display 120.

Hereinafter, any one of the operation buttons 108a through 108e will be referred to as an "operation button 108", and any one of the connection holes 1132a through 1132c will be referred to as a "connection hole 1132".

The arm 1200 is installed on the housing 1100 via a torque hinge 1210, so that the arm 1200 is vertically rotatable with respect to the housing 1100, in a tilt angle range θ1 of 135 degrees. FIG. 4 indicates that a state of the arm 1200 where the tilt angle θ1 is 90 degrees.

The camera housing 1300 has a built-in-type the camera 112, and it is possible to take images of a user, a document, a room, and so forth through the camera 112. Also, the camera housing 1300 has a torque hinge 1310. The camera housing 1300 is installed on the arm 1200 through the torque hinge 1310. The camera housing 1300 is rotatable vertically and horizontally with respect to the arm 1200, in a panning range of θ2 of ±180 degrees and a tilt angle range θ3 of ±45 degrees from the state of the camera housing 1300 illustrated in FIG. 4.

Note that the UI providing apparatus 20, the relay apparatuses 30, the transmission management apparatus 50, the program providing apparatus 90, and a maintenance system 100 have outlines the same as a common server computer. Therefore, description of the outlines will be omitted. The information processing terminal 40 has an outline the same as a common PC, a smartphone, a tablet terminal, or the like, and therefore, description of the outline will be omitted.

FIG. 5 illustrates one example of a hardware configuration of a transmission terminal 10. As illustrated in FIG. 5, the transmission terminal 10 includes a CPU (Central Processing Unit) 101 controlling the entirety of the transmission terminal 10, a ROM (Read-Only Memory) 102 storing programs such as an IPL (Initial Program Loader) used to drive the CPU 101, a RAM (Random Access Memory) 103 used as a work area of the CPU 101, a flash memory 104 storing various sorts of data such as the transmission terminal control program 1000a, and image data and sound data, a solid state drive (SSD) 105 controlling reading various sorts of data from the flash memory 104 and writing various sorts of data to the flash memory 104 under the control of the CPU 101, a medium drive 107 controlling reading data from a recording medium 106 such as a flash memory and writing (storing) data to the recording medium 106, the operation buttons 108 operated for selecting a destination of the transmission terminal 10, for example, the power switch 109 for turning on and off the power in the transmission terminal 10, and a network I/F 111 for data transmission via the transmission network 2 (FIG. 1).

Also, the transmission terminal 10 includes the built-in-type the camera 112 to acquire image data by taking an image of a subject under the control of the CPU 101, an image sensor I/F 113 to control driving the camera 112, the microphone 114 as a built-in-type sound collection device to input sounds, the built-in-type speaker 115 to output sounds, a sound input and output I/F 116 inputting and outputting sound signals between the microphone 114 and the speaker 115 under the control of the CPU 101, a display I/F 117 transmitting image data to an externally installed display 120 under the control of the CPU 101, the external apparatus connection I/F 118 to connect various external apparatuses, and a bus line 110 such as an address bus, a data bus, and so forth to electrically connect the above-mentioned respective elements.

A display 120 is a display device using a liquid crystal or an organic electroluminescence (EL) to display an image of a subject, operation icons, and so forth. The display 120 is connected to the display I/F 117 via the cable 120c. The cable 120c may be an analog RGB (VGA) signal cable, a component video cable, a cable for HDMI (High-Definition Multimedia Interface) (registered trademark), or a DVI (Digital Video Interactive) signal.

The camera 112 includes a lens and a solid-state image sensing device to acquire image data of an image of a subject by converting light into charge. As the solid-state image sensing device, a CMOS (Complementary Metal Oxide Semiconductor), a CCD (Charge Coupled Device), or the like is used.

It is possible to connect an external apparatus such as an externally installed camera, an externally installed microphone, an externally installed speaker, and so forth to the external apparatus connection I/F 118 through a USB (Universal Serial Bus) cable, or the like.

If an externally installed camera is connected to the external apparatus connection I/F 118, the CPU 101 drives the externally installed camera in priority to the built-in-type the camera 112. Also, if an externally installed microphone or an externally installed speaker is connected to the external apparatus connection I/F 118, the CPU 101 drives the externally installed microphone or the externally installed speaker in priority to the built-in-type microphone 114 or the built-in-type speaker 115.

Note that the recording medium 106 is detachable to the transmission terminal 10. Also, the transmission terminal 10 may use, as a nonvolatile memory for reading data and writing data under the control of the CPU 101, an EEPROM (Electrically Erasable and Programmable ROM), or the like, instead of the flash memory 104.

The transmission terminal control program 1000*a* may be a file of an installable or executable type, and may be circulated in a form of a computer readable medium such as the recording medium 106. Also, the transmission terminal control program 1000*a* may be stored in the ROM 102 instead of the flash memory 104.

The information processing terminal 40 has a hardware configuration the same as or similar to the transmission terminal 10, and therefore, description of the hardware configuration will be omitted. However, in the SSD 105, the information processing terminal program to control the information processing terminal 40 is stored.

Figure 6:
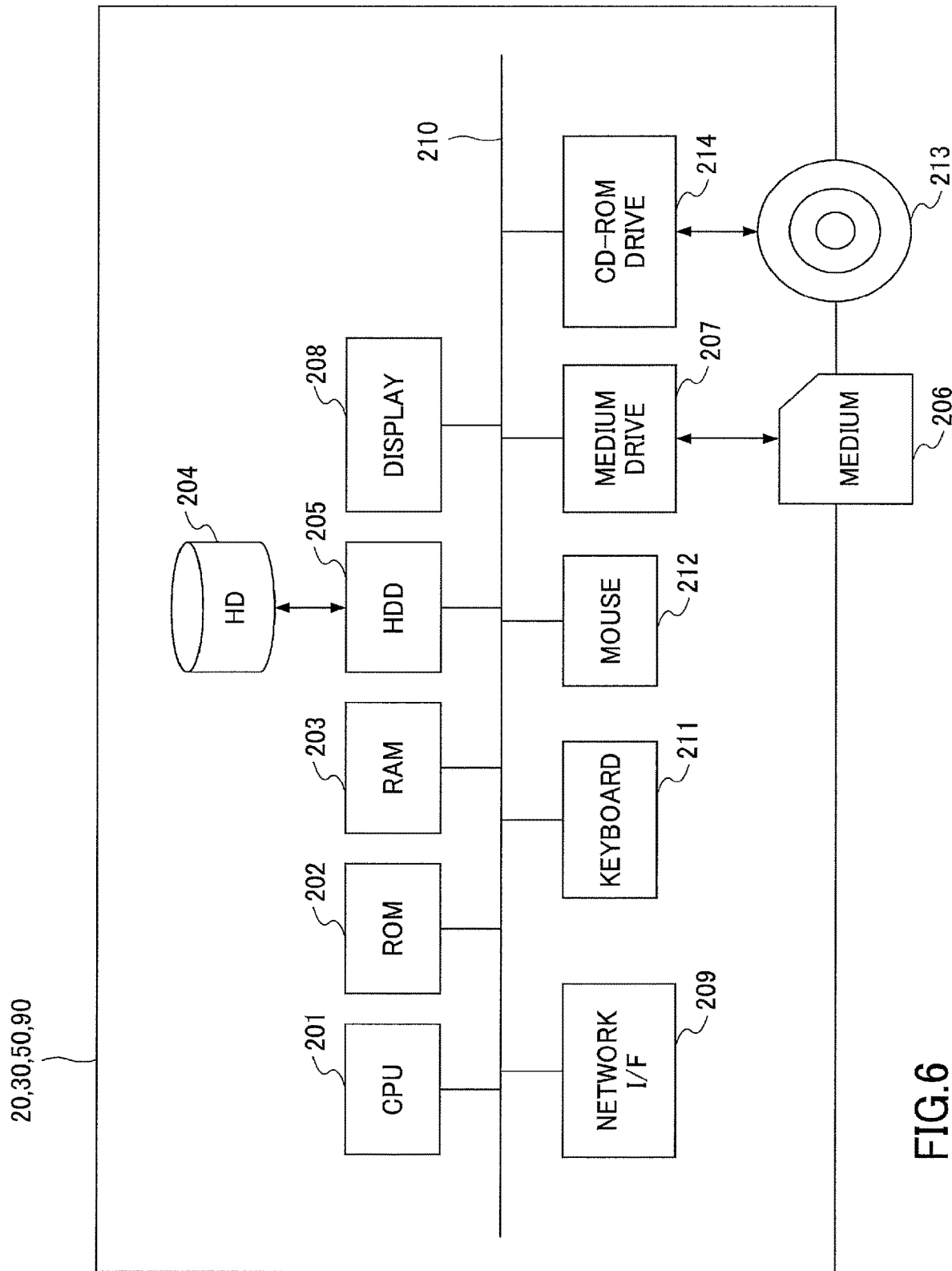
FIG. 6 is a hardware configuration diagram of any one of a transmission management apparatus, a UI providing apparatus, a relay apparatus, and a program providing apparatus.

FIG. 6 is a hardware configuration diagram of any one of the transmission management apparatus 50, the UI providing apparatus 20, a relay apparatus 30, and the program providing apparatus 90. As illustrated in FIG. 6, the transmission management apparatus 50 includes a CPU 201 to control the entirety of the transmission management apparatus 50, a ROM 202 to store programs such as an IPL to drive the CPU 201, a RAM 203 used as a work area of the CPU 201, a HD204 to store various sorts of data such as the transmission management program, a hard disk drive (HDD) 205 to control reading various sorts of data from and writing various sorts of data to the HD204 under the control of the CPU 201, a medium drive 207 to control reading data from and writing (storing) data to (in) a recording medium 206 such as a flash memory, a display 208 to display various sorts of information such as a cursor, a menu, a window, a character/letter, an image, and so forth, a network I/F 209 for data transmission through the transmission network 2 (FIG. 1), a keyboard 211 including a plurality of keys for inputting character/letters, numerical values, various instructions, and so forth, a mouse 212 for selecting or executing various instructions, selecting a processing target, moving the cursor, and so forth, a CD-ROM (Compact Disc Read-Only Memory) drive 214 to control reading various sorts of data from and writing various sorts of data to a CD-ROM 213 as an example of a detachable recording medium, and a bus line 210 such as an address bus and a data bus to electrically connect the respective elements.

Note that the transmission management program may be a file of an installable or executable type, and may be circulated in a form of a computer readable medium such as the recording medium 206 or the CD-ROM 213. Also, the transmission management program may be stored in the ROM 202 instead of the HD 204.

A relay apparatus 30 has a hardware configuration the same as or similar to the transmission management apparatus 50, and therefore, description of the hardware configuration will be omitted. However, in the HD 204, the relay apparatus program to control the relay apparatus 30 is stored.

Also in this case, the relay apparatus program may be a file of an installable or executable type, and may be circulated in a form of a computer readable medium such as the recording medium 206 or the CD-ROM 213. Also, the relay apparatus program may be stored in the ROM 202 instead of the HD 204.

Also, the program providing apparatus 90 has a hardware configuration the same as or similar to the transmission management apparatus 50, and therefore, description of the hardware configuration will be omitted. However, in the HD 204, the program providing apparatus program to control the program providing apparatus 90 is stored.

Also in this case, the program providing apparatus program may be a file of an installable or executable type, and may be circulated in a form of a computer readable medium such as the recording medium 206 or the CD-ROM 213. Also, the program providing apparatus program may be stored in the ROM 202 instead of the HD 204.

Also, the UI providing apparatus 20 has a hardware configuration the same as or similar to the transmission management apparatus 50, and therefore, description of the hardware configuration will be omitted. However, in the HD 204, the UI providing apparatus program to control the UI providing apparatus 90 and layout information described later is stored.

Also in this case, the UI providing apparatus program and the layout information may be files of an installable or executable type, and may be circulated in a form of a computer readable medium such as the recording medium 206 or the CD-ROM 213. Also, the UI providing apparatus program and the layout information may be stored in the ROM 202 instead of the HD 204.

Note that as the above-mentioned computer readable recording media, CD-R (Compact Discs Recordable), DVD (Digital Versatile Disks), Blu-ray disks, or the like may be used.

Figure 7:
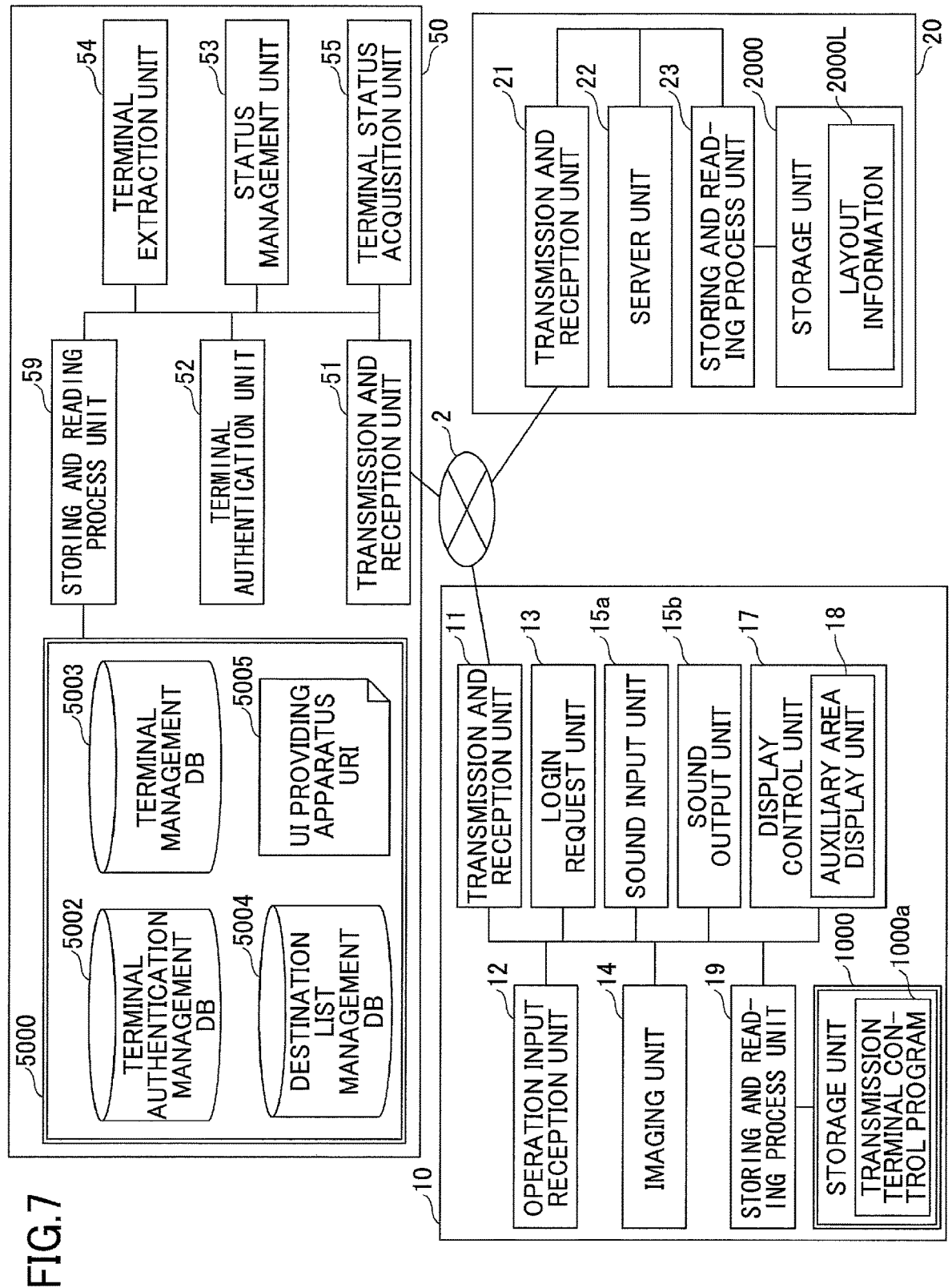
FIG. 7 is one example of a functional block diagram of each of the terminals, the apparatuses and the system included in the transmission system.

FIG. 7 is a functional block diagram of any one of the terminals, apparatuses and the system included in the transmission system 1. As illustrated in FIG. 7, a transmission terminal 10, a relay apparatus 30 and the transmission management apparatus 50 are connected together via the transmission network 2 in such a manner as to enable data transmission. Note that because the relay apparatuses 30 and the program providing apparatus 90 illustrated in FIG. 1 do not directly relate to data transmission concerning video conferences, the relay apparatus 30 and the program providing apparatus 90 are omitted in FIG. 7. Because the information processing terminal 40 has a function equivalent to a transmission terminal 10, the transmission terminal 10 in FIG. 7 may be the information processing terminal 40.

A functional configuration of a transmission terminal 10 will be described. The transmission terminal 10 includes a transmission and reception unit 11, an operation input reception unit 12, a login request unit 13, an imaging unit 14, a sound input unit 15*a*, a sound output unit 15*b*, a display control unit 17, and a storing and reading process unit 19. These elements are functions implemented by the CPU 101 executing the transmission terminal control program 1000*a* written in the RAM 103 from the flash memory 104. Also, the transmission terminal 10 has a storage unit 1000 implemented by the RAM 103 and the flash memory 104.

The transmission and reception unit 11 is implemented by the CPU 101 and the network I/F 111, and transmits various sorts of data and information to and receives various sorts of data and information from another transmission terminal 10, a relay apparatus 30, the transmission management apparatus 50, and the program providing apparatus 90 via the transmission network 2.

The transmission and reception unit 11 starts receiving respective items of status information that indicate statuses of the respective transmission terminals 10 as candidates for connecting destinations concerning a video conference, from the transmission management apparatus 50, before starting the video conference with the desired destination terminals.

The status information indicates not only an operational status as to whether each transmission terminal 10 is in an online status or an offline status but also a detailed operational status as to whether each transmission terminal 10 is in an online and transmission possible status or in an online and under transmission status, or the like.

Also, the status information indicates not only the operational status of each transmission terminal 10 but also various statuses of each transmission terminal 10 as to whether the cable 120c is removed from the transmission terminal 10, the transmission terminal 10 outputs a sound but does not output an image, the transmission terminal 10 is in a state where the transmission terminal 10 is prevented from outputting a sound (MUTE), and so forth. However, hereinafter, for the sake of easily understanding the present invention, a case where status information indicates an operational status of each transmission terminal 10 will be described.

The operation input reception unit 12 is implemented by the CPU 101, the operation buttons 108, and the power switch 109, and receives user's various inputs. For example, if a user turns on the power switch 109, the operation input reception unit 12 receives the power-turning-on operation, to turn on the power in the transmission terminal 10.

The login request unit 13 is implemented by the CPU 101, and, in response to reception of a power-turning-on operation, the login request unit 13 transmits login request information that indicates a request to login and a current IP address of the transmission terminal 10, to the transmission management apparatus 50 from the transmission and reception unit 11 via the transmission network 2.

Also, if a user operates the power switch 109, from the turned on state to the turned off state, the operation input reception unit 12 completely turns off the power in the transmission terminal 10 after the transmission and reception unit 11 transmits status information that indicates to turn off the power to the transmission management apparatus 50. Therefore, the transmission management apparatus 50 can know that the transmission terminal 10 is switched from the power turned on state to the power turned off state.

The imaging unit 14 is implemented by the CPU 101, the camera 112, and the image sensor I/F 113, takes an image of a subject, and outputs image data acquired from taking the image to the transmission and reception unit 11.

The sound input unit 15a is implemented by the CPU 101 and the sound input and output I/F 116. A sound signal that represents a sound collected by the microphone 114 is input to the sound input unit 15a which converts the input sound signal into sound data.

The sound output unit 15b is implemented by the CPU 101 and the sound input and output I/F 116, convers sound data into a sound signal, outputs the converted sound signal to the speaker 115 which then outputs a corresponding sound.

The display control unit 17 is implemented by the CPU 101 and the display I/F 117, combines respective pieces of image data received by the transmission and reception unit 11 having different resolutions, transmits the combined image data to the display 120 which then displays an image expressed by the image data.

Also, the display control unit 17 transmits destination list information that the transmission and reception unit 11 receives from the transmission management apparatus 50 to the display 120 which thus displays a corresponding destination list.

The display control unit 17 has an auxiliary area display unit 18. If the transmission terminal 10 is in a full screen display mode that will be described later, the auxiliary area display unit 18 displays the number of bases participating a conference, and so forth, in an auxiliary area of a display screen page.

The storing and reading process unit 19 is implemented by the CPU 101 and the SSD 105, and stores various sorts of data in the storage unit 1000, and reads various sorts of data from the storage unit 1000.

The storage unit 1000 stores an identifier for identifying the transmission terminal 10 (also referred to as identification information, and, hereinafter, referred as a "terminal ID"), a password, and so forth. Also, the storage unit 1000 is used as a reception buffer for storing image data and sound data that are received when the transmission terminal 10 carries out a video conference with a destination terminal.

Note that the terminal ID according to the present embodiment denotes information for uniquely identifying the transmission terminal 10 such as a language, characters/letters, a symbol, or any one of various signs. Also, the terminal ID may be information acquired from combining at least two of a language, characters/letters, a symbol, and any one of various signs.

A functional configuration of the transmission management apparatus 50 will now be described. The transmission management apparatus 50 includes a transmission and reception unit 51, a terminal authentication unit 52, a status management unit 53, a terminal extraction unit 54, a terminal status acquisition unit 55, and a storing and reading process unit 59. These units are functions implemented by the CPU 201 that executes the transmission management program written in the RAM 203 from the HD 204. Also, the transmission management apparatus 50 has a storage unit 5000 implemented by the HD 204.

In the storage unit 5000, a terminal authentication management DB 5002 that has a terminal authentication management table 5002T such as a table illustrated in FIG. 8 is established. In the terminal authentication management table 5002T, passwords are associated with respective terminal IDs of all the transmission terminals 10 managed by the transmission management apparatus 50 and are managed. For example, the terminal authentication management table 5002T illustrated in FIG. 8 indicates a password "aaaa" for a terminal ID "01aa" of a transmission terminal 10aa.

Also, in the storage unit 5000, a terminal management DB 5003 that has a terminal management table 5003T such as a table illustrated in FIGS. 9A and 9B is established. FIG. 9A illustrates the terminal management table 5003T where the transmission terminal 10aa that has the terminal ID "01aa" has logged in, and FIG. 9B illustrates the terminal management table 5003T where the transmission terminal 10aa that has the terminal ID "01aa" has transmitted start request information that will be described later.

In the terminal management table 5003T, for the terminal ID of each transmission terminal 10, an identifier of the transmission terminal 10 (hereinafter, referred to as a "terminal name"), the operational status of the transmission terminal 10, the received date and time at which the transmission management apparatus 50 has received login request information for logging in to transmission system 1, and the IP address of the transmission terminal 10 are associated with each other, and are managed.

For example, the terminal management table 5003T illustrated in FIG. 9A indicates that the transmission terminal 10aa that has the terminal ID "01aa" has a terminal name "Japan Tokyo office AA terminal", and the operational status "online (transmission possible)", the date and time at which the transmission management apparatus 50 has received login request information is "13:40, Nov. 10, 2009", and the transmission terminal 10aa has the IP address "1.2.1.3".

The terminal ID in the terminal management table 5003T is uniquely assigned to each transmission terminal 10 when the transmission terminal 10 is registered with the transmission system 1 before login request information that is transmitted in step S22 of FIG. 11 described later is transmitted, and the terminal name is registered or changed by an administrator of the transmission management apparatus 50. Note that the terminal name may be registered or changed according to a request that is transmitted from the transmission terminal 10 to the transmission management apparatus 50.

The operational status "online (transmission possible)" denotes a state where the transmission terminal 10 has logged in the transmission system 1, and has not participated in a video conference. The operational status "online (under transmission)" denotes a state where the transmission terminal 10 has logged in the transmission system 1, and has participated in a video conference. The operational status "offline" denotes a state where the transmission terminal 10 has not logged in the transmission system 1. A transmission terminal 10 that has participated in a video conference is a transmission terminal 10 that has an operational status "online (under transmission)".

Also, in the storage unit 5000, a destination list management DB 5004 that has a destination list management table 5004T such as a table illustrated in FIG. 10 is established. Note that the destination list management DB 5004 corresponds to a destination list management table storage unit.

In the destination list management table 5004T, all of the terminal IDs of destination terminals registered as candidates for destination terminals are associated with the terminal ID of a requesting terminal that requests to start a video conference, and are managed.

For example, the destination list management table 5004T illustrated in FIG. 10 indicates that candidates for destination terminals to which the transmission terminal 10aa that has the terminal ID "01aa" requests to start a video conference are the transmission terminal 10ab of the terminal ID "01ab", the transmission terminal 10ba of the terminal ID "01ba", and the transmission terminal 10db of the terminal ID "01db". Candidates for destination terminal are added or deleted according to a request that is transmitted from a transmission terminal 10 to the transmission management apparatus 50.

In the destination list management table 5004T, candidates for destination terminals to which a transmission terminal 10 requests to start a video conference are registered. The transmission terminals 10 that can participate in a video conference are not limited to the transmission terminals 10 registered in the destination list management table 5004T.

Also, in the storage unit 5000, the URI (Uniform Resource Identifier) 5005 of the UI providing apparatus 20 is stored. The URI 5005 of the UI providing apparatus 20 is set by an administrator of the transmission management apparatus 50 or the UI providing apparatus 20.

The transmission and reception unit 51 is implemented by the CPU 201 and the network I/F 209, and transmits various sorts of data and information to and receives various sorts of data and information from a transmission terminal 10, a relay apparatus 30, and the program providing apparatus 90 via the transmission network 2.

The terminal authentication unit 52 is implemented by the CPU 101, and searches the terminal authentication management DB 5002 of the storage unit 5000 using the terminal ID and the password included in login request information received by the transmission and reception unit 51 as search keys, to carry out terminal authentication by determining whether the same terminal ID and password are managed in the terminal authentication management DB 5002.

The status management unit 53 is implemented by the CPU 101, and, in order to manage the operational status of a requesting terminal that has transmitted a login request, associates the operational status, the received date and time at which the transmission management apparatus 50 has received the login request information, and the IP address with the terminal ID of the requesting terminal, store the associated information in the terminal management DB 5003 (FIGS. 9A and 9B) to manage the stored information.

Also, the status management unit 53 changes the operational status of a transmission terminal 10 from "online" to "offline" in the terminal management DB 5003 (see FIGS. 9A and 9B) based on the status information that indicates to turn off the power transmitted from the transmission terminal 10 as a result of the user switching the state of the power switch of the transmission terminal 10 from the turned on state to the turned off state The terminal extraction unit 54 is implemented by the CPU 101, and searches the destination list management DB 5004 (FIG. 10) using the terminal ID of a requesting terminal that has transmitted a login request as a search key to extract the terminal IDs of candidates for destination terminals of the requesting terminal.

Also, the terminal extraction unit 54 searches the destination list management DB 5004 (FIG. 10) using the terminal ID of a requesting terminal that has transmitted a login request as a search key to extract the terminal IDs of other requesting terminals that register the terminal ID of the requesting terminal as candidates for destination terminals.

The terminal status acquisition unit 55 is implemented by the CPU 101, and searches the terminal management DB 5003 (FIGS. 9A and 9B) using the terminal IDs of candidates for destination terminals extracted by the terminal extraction unit 54 as search keys, to read the operational statuses for the thus detected terminal IDs.

Thereby, the terminal status acquisition unit 55 can acquire the operational statuses of candidates for destination terminals of a requesting terminal that has transmitted a login request. Also, the terminal status acquisition unit 55 searches the terminal management DB 5003 using a terminal ID extracted by the terminal extraction unit 54 as a search key, to acquire the operational status of a requesting terminal that has transmitted a login request.

The storing and reading process unit 59 is implemented by the CPU 101 and the HDD 205, stores various sorts of data in the storage unit 5000, and read various sorts of data from the storage unit 5000.

A functional configuration the UI providing apparatus 20 will be described. The transmission and reception unit 21 is implemented by the CPU 201 and the network I/F 209, and transmits various sorts of data and information to and receives various sorts of data and information from a transmission terminal 10 via the transmission network 2.

The server unit 22 is implemented by the CPU 101, acquires a layout information request signal from a transmission terminal 10, to transmit layout information 2000L that is read from the storage unit 2000 by the storing and reading process unit 23 to the transmission terminal 10 via the transmission and reception unit 21.

The storing and reading process unit 23 is implemented by the CPU 101, stores various sorts of data in the storage unit 2000, and reads various sorts of information from the storage unit 2000. The storage unit 2000 is implemented by the HDD 205, and mainly stores the layout information 2000L.

Next, operation of the transmission system 1 according to the present embodiment will be described. FIG. 11 is a sequence diagram illustrating a preparation stage operation carried out until a transmission terminal 10 enters a prepared state where the transmission terminal 10 will participate in a video conference. Note that FIG. 11 illustrates an example where the transmission terminal 10aa comes to enter the prepared state. In the preparation stage operation, various sorts of information is transmitted and received in the management information session 3001 (FIG. 2).

First, in step S21, when a user of the transmission terminal 10aa has turned on the power switch 109 of the transmission terminal 10aa, the operation input reception unit 12 receives the power-turning-on operation to turn on the power. Then, in step S22, in response to the reception of the power-turning-on operation, the login request unit 13 transmits login request information that indicates a login request to the transmission management apparatus 50 through the transmission and reception unit 11 of the transmission terminal 10aa via the transmission network 2.

The login request information includes the terminal ID and the password to identify the transmission terminal 10aa that has transmitted the login request. The terminal ID and the password are read by the storing and reading process unit 19 from the storage unit 1000.

Note that when the login request information transmitted from the transmission terminal 10aa has been received by the transmission management apparatus 50, the transmission management apparatus 50 can know the IP address of the transmission terminal 10aa on the transmission side.

Next, in step S23, the terminal authentication unit 52 of the transmission management apparatus 50 carries out a terminal authentication operation by searching the terminal authentication management DB 5002 (FIG. 8) of the storage unit 5000 using the terminal ID and the password included in the login request information received through the transmission and reception unit 51 as search keys to determine whether the terminal authentication management DB 5002 has managed the same terminal ID and password as the search keys.

If the terminal authentication unit 52 has determined that the terminal authentication management DB 5002 has not managed the same terminal ID and password as the search keys, that is, if it is determined that the login request is not a login request from a transmission terminal 10 that has legitimate usage authority, the transmission and reception unit 51 transmits authentication result information that indicates the authentication result acquired by the terminal authentication unit 52 to the transmission terminal 10aa that has requested login via the transmission network 2, and thus, the operation in the preparation stage is ended.

On the other hand, if the terminal authentication unit 52 has determined that the terminal authentication management DB 5002 has managed the same terminal ID and password as the search keys, that is, it is determined that the login request is a login request from a transmission terminal 10 that has legitimate usage authority, the status management unit 53 associates the terminal ID and the operational status of the transmission terminal 10aa, the received date and time at which the login request information has been received, and the IP address of the transmission terminal 10aa with each other, and stores the associated items of information in the terminal management DB 5003 (FIG. 9A) in step S24.

Thus, as illustrated in FIG. 9A, the terminal management table 5003T associates the terminal ID "01aa", the operational status "online (transmission possible)", the received date and time "2009.11.10.13:40", and the IP address "1.2.1.3" of the transmission terminal 10aa with each other, and manages the associated items of information.

Next, in step S25, the transmission and reception unit 51 of the transmission management apparatus 50 transmits authentication result information that indicates the authentication result acquired by the terminal authentication unit 52 to the transmission terminal 10aa that has requested login via the transmission network 2. Also, the transmission management apparatus 50 transmits, together with the authentication result information, or before or after the transmission of the authentication result information, the URI 5005 of the UI providing apparatus 20 to the transmission terminal 10aa. Thereby, the transmission terminal 10aa comes to be able to access the UI providing apparatus 20.

The URI 5005 of the UI providing apparatus 20 indicates the place where the layout information 2000L is stored in the transmission network 2. For example, the URI has a format such as "IP address (or a domain name)+folder name+file name", and can have any format as long as it is possible to access the UI providing apparatus 20.

As a result of the URI 5005 being not stored by each transmission terminal 10, it is sufficient for the administrator of the transmission management apparatus 50 to change the URI stored by the transmission management apparatus 50, even if the UI providing apparatus 20 is replaced, the URI is changed, or the like. That is, because it is not necessary to change the URL in all the transmission terminals 10, it is possible to reduce the management load.

Next, in step S26, the terminal extraction unit 54 of the transmission management apparatus 50 searches the destination list management DB 5004 (FIG. 10) using the terminal ID "01aa" of the transmission terminal 10aa that has requested login as a search key, to extract the terminal IDs of candidates for destinations of the transmission terminal 10aa.

In this example, the respective terminal IDs "01ab", "01ba", and "01db" of the transmission terminals 10ab, 10ba, and 10db that are destination terminals of the transmission terminal 10aa having the terminal ID "01aa" are extracted.

Next, in step S27, the terminal status acquisition unit 55 of the transmission management apparatus 50 acquires the respective operational statuses of the transmission terminals 10ab, 10ba, and 10db by searching the terminal management DB 5003 (FIG. 9A) using the terminal ID "01ab", "01*ba*", and "01*db*" of the candidates for destination terminals extracted by the terminal extraction unit 54 as search keys, to read the operational statuses, i.e., "offline", "online (transmission possible)", or "online (under transmission)", for the respective terminal IDs extracted by the terminal extraction unit 54.

Next, in step S28, the transmission and reception unit 51 of the transmission management apparatus 50 transmits destination status information that includes the terminal IDs "01*ab*", "01*ba*", and "01*db*" used in step S27 as the search keys, and the respective operational statuses, i.e., "offline", "online (transmission possible)", or "online (under transmission)", of the corresponding transmission terminals 10*ab*, 10*ba*, 10*db* to the transmission terminal 10*aa* via the transmission network 2.

Thereby, the transmission terminal 10*aa* can know the current respective operational statuses, i.e., "offline", "online (transmission possible)", or "online (under transmission)", of the transmission terminal 10*ab*, 10*ba*, and 10*db* that are candidates for destination terminals.

Also, in step S29, the terminal extraction unit 54 of the transmission management apparatus 50 searches the destination list management DB 5004 (FIG. 10) using the terminal ID "01*aa*" of the transmission terminal 10*aa* that has requested login as a search key, to extract the terminal IDs of other transmission terminals 10 each of which registers the terminal ID "01*aa*" of the transmission terminal 10*aa* as a candidate for a destination terminal. For example, in the destination list management table 5004T illustrated in FIG. 10, the terminal IDs "01*ab*", "01*ba*", and "01*db*" are extracted.

Next, in step S30, the status management unit 53 of the transmission management apparatus 50 searches the terminal management DB 5003 (FIG. 9A) using the terminal ID "01*aa*" of the transmission terminal 10*aa* that has requested login as a search key, to acquire the operational status "online (transmission possible)" of the transmission terminal 10*aa* that has requested login.

Next, in steps S31-1 and S31-2, the transmission and reception unit 51 of the transmission management apparatus 50 transmits destination status information that includes the terminal ID "01*aa*" and the operational status "online (transmission possible)" of the transmission terminal 10*aa* acquired in step S30, to the transmission terminals 10*ba* and 10*db* which have the operational statuses "online" in the terminal management DB 5003 (FIG. 9A) from among the respective transmission terminals 10*ab*, 10*ba*, and 10*db* respectively identified by the terminals ID "01*ab*", "01*ba*", and "01*db*" extracted in S29.

Note that, when the destination status information will be transmitted to the transmission terminals 10*ba* and 10*db*, the transmission and reception unit 51 reads the IP addresses of the transmission terminals managed in the terminal management table 5003T illustrated in FIG. 9A based on the respective terminal IDs "01*ba*" and "01*db*".

Thus, it is possible to report the terminal ID "01*aa*" and the operational status "online (transmission possible)" of the transmission terminal 10*aa* that has requested login to the transmission terminals 10*db* and 10*ba* each of which can transmit data to the transmission terminal 10*aa* that has requested login as a destination.

Also, the display control unit 17 of the transmission terminal 10*aa* can allow the user to know the transmission terminal 10 that has participated in or can participate in the video conference by, for example, highlighting the information item of the transmission terminal 10*db* that has participated in or can participate in the video conference, that is, the information item of the transmission terminal 10*db* that has the operational status "online (under transmission)" or "online (transmission possible)" on the display 120 from among information items of the destination list displayed on the display 120, when step S28 of the preparation operation has been completed.

Figure 12:
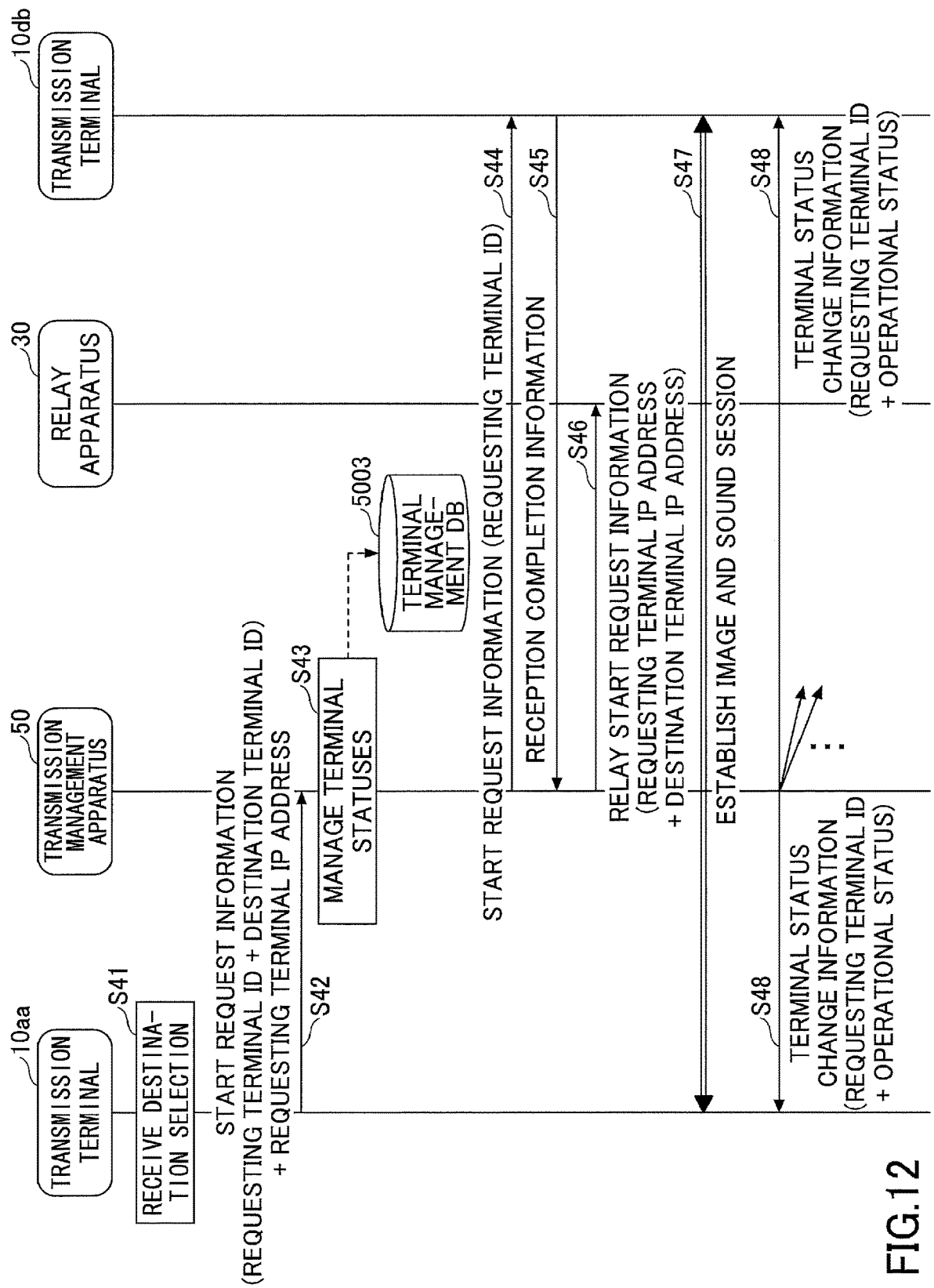
FIG. 12 is one example of a sequence diagram illustrating a conference participation operation carried out until a transmission terminal enters a participated state where the transmission terminal has participated in the video conference.

FIG. 12 is a sequence diagram illustrating a conference participating operation carried out until a transmission terminal 10 enters a participated state where the transmission terminal 10 has participated in the video conference. Note that FIG. 12 illustrates an example where the transmission terminal 10*aa* enters a participated state. In the conference participating operation, various sorts of information is transmitted and received in the management information session 3001 (FIG. 2).

First, in step S41, as a result of the user pressing an operation button 108 (FIG. 4) to select to participate in the video conference, the operation input reception unit 12 receives a request to participate in the video conference with the transmission terminal 10*db*. Note that if the transmission terminal 10*aa* is the information processing terminal 40, the operation input reception unit 12 receives a request to participate in the video conference as a result of a hardware key or a software key displayed on a touch panel of the information processing terminal 40, instead of the operation button 108, being pressed.

In step S42, in response to the request, the transmission and reception unit 11 of the transmission terminal 10*aa* transmits participation request information that includes the terminal ID "01*aa*" of the transmission terminal 10*aa* and the terminal ID "01*db*" of the transmission terminal 10*db*, and indicates to participate in the video conference to the transmission management apparatus 50.

Thereby, the transmission and reception unit 51 of the transmission management apparatus 50 can receive the participation request information and can know the IP address "1.2.1.3" of the transmission terminal 10*aa* that has transmitted the information.

Next, in step S43, the status management unit 53 of the transmission management apparatus 50 searches the terminal management DB 5003 using the terminal ID "01*aa*" of the transmission terminal 10*aa* included in the participation request information as a search key to set the operational status of the transmission terminal 10*aa* that has requested to participate in the video conference to be "online (under transmission)". Thus, the operational status in the terminal management table 5003T is updated (FIG. 9B).

Next, in step S44, the transmission and reception unit 51 of the transmission management apparatus 50 transmits start request information that includes the terminal ID "01*aa*" of the transmission terminal 10*aa* to the transmission terminal 10*db* through the transmission network 2. Thereby, the transmission terminal 10*db* can know which transmission terminal 10 has requested to participate in the video conference.

Although detailed description will be omitted for the sake of easily understanding the embodiment, the transmission and reception unit 51 of the transmission management apparatus 50 transmits start request information that includes the terminal ID "01*aa*" of the transmission terminal 10*aa* also to the transmission terminal 10*cb* through the transmission network 2 because also the operational status of the transmission terminal 10*cb* is "online (under transmission)" in the terminal management DB 5003 illustrated in FIG. 9B.

Next, in step S45, the transmission terminal 10*db* transmits reception completion information that indicates that reception of the start request information has been completed, from the transmission and reception unit 11 to the transmission management apparatus 50 via the transmission network 2.

Next, in step S46, the transmission and reception unit 51 of the transmission management apparatus 50 transmits relay start request information that indicates a request to start relaying to the relay apparatus 30 via the transmission network 2. The relay start request information includes the respective IP addresses "1.2.1.3" and "1.3.2.4" of the transmission terminal 10aa and the transmission terminal 10db.

Thereby, in step S47, the relay apparatus 30 establishes a session for transmitting 3 types, i.e., low resolution, medium resolution, and high resolution, of image data, and sound data between the transmission terminals 10aa and 10db. Thus, the transmission terminal 10aa comes to be able to participate in the video conference with the transmission terminal 10db.

Also, in step S48, the transmission and reception unit 51 of the transmission management apparatus 50 transmits terminal status change information that includes the terminal ID "01aa" and the operational status "online (under transmission) of the transmission terminal 10aa to the respective transmission terminals 10 registered in the terminal management DB 5003 (FIG. 9B). Thereby, the respective transmission terminals 10 that have received the terminal status change information can, as appropriate, store and display the operational status of the transmission terminal 10aa of the terminal ID "01aa".

Figure 13:
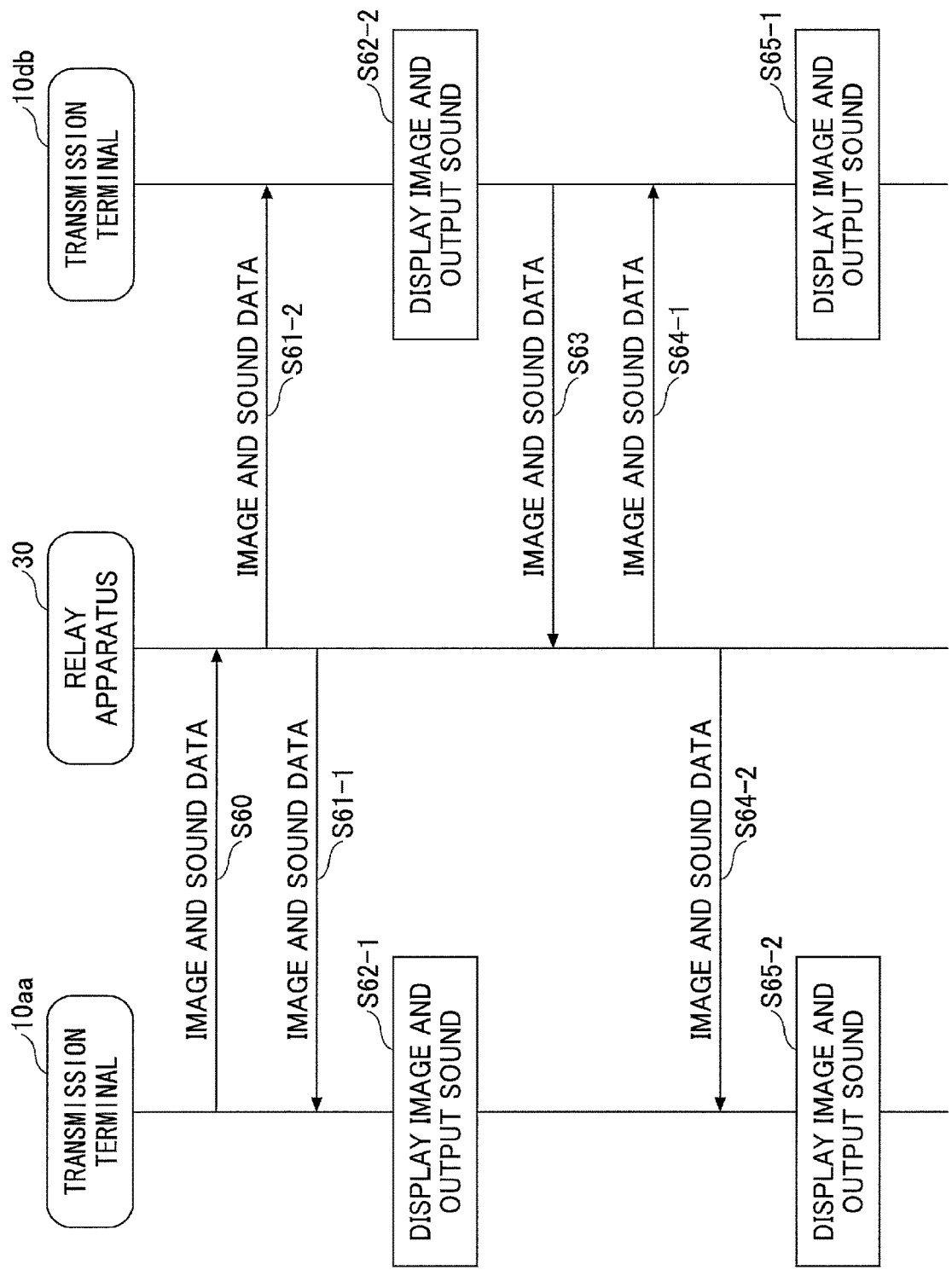
FIG. 13 is one example of a sequence diagram illustrating a data transmission operation between transmission terminals.

FIG. 13 is a sequence diagram illustrating a data transmission operation between transmission terminals 10. Note that in the data transmission operation illustrated in FIG. 13, image data and sound data are transmitted and received in an image and sound data session 300D (FIG. 2).

After the session is established between the transmission terminals 10aa and 10db as described above with reference to FIG. 12, the transmission terminal 10aa transmits image data taken by the imaging unit 14 and sound data converted from a sound signal that is input to the sound input unit 15a to the relay apparatus 30 through the transmission and reception unit 11 in step S60.

In steps S61-1 and S61-2, the relay apparatus 30 that has received the image data and the sound data from the transmission terminal 10aa transmits the received image data and sound data to the respective transmission terminals 10aa and 10db that have participated in the video conference.

In steps S62-1 and S62-2, the respective transmission terminals 10aa and 10db that have received the image data and the sound data from the relay apparatus 30 display images expressed by the received image data on the displays 120 through the display control units 17, and output sounds expressed by the received sound data from the speakers 115 through the sound output units 15b.

Next, in step S63, the transmission terminal 10db transmits image data taken by the imaging unit 14 and sound data converted from a sound signal that is input to the sound input unit 15a to the relay apparatus 30 through the transmission and reception unit 11.

In steps S64-1 and S64-2, the relay apparatus 30 that has received the image data and the sound data from the transmission terminal 10db transmits the received image data and sound data to the respective transmission terminals 10aa and 10db that have participated in the video conference.

In steps S65-1 and S65-2, the respective transmission terminals 10aa and 10db that have received the image data and the sound data from the relay apparatus 30 display images expressed by the received image data on the displays 120 through the display control units 17, and output sounds expressed by the received sound data from the speakers 115 through the sound output units 15b.

Thus, the transmission terminals 10aa and 10db can carry out the video conference through the relay apparatus 30. Note that in FIG. 13, for the sake of easily understanding the present embodiment, the transmission terminals 10 that participate in the video conference are the two transmission terminals 10aa and 10db. However, transmission terminals 10 that participate in a video conference can be three or more transmission terminals. Also in this case, image data and sound data are transmitted in the same way as the data transmission operation illustrated in FIG. 13.

Displaying an image in a transmission terminal 10 will be described. The display control unit 17 according to the present embodiment has two display modes, i.e., a full screen display mode and an information display mode.

Figure 14:
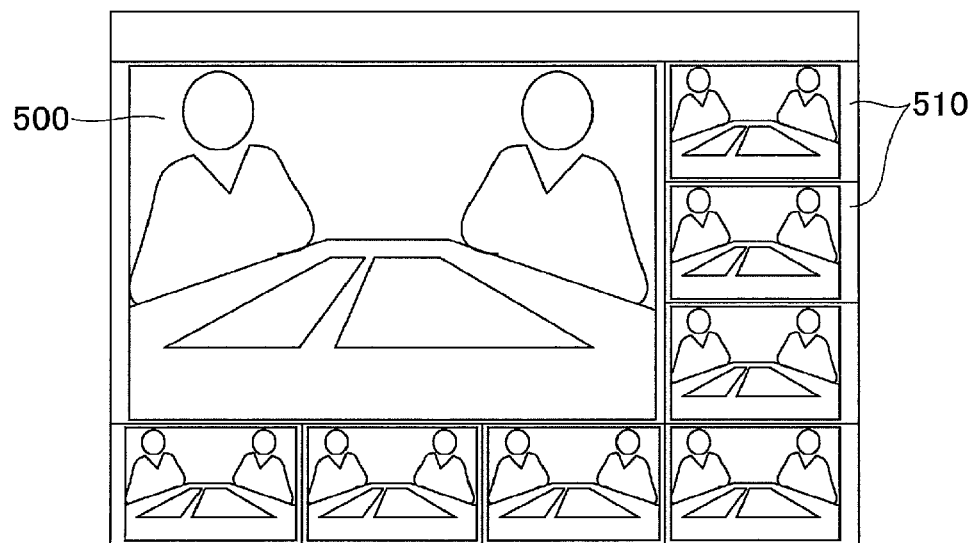
FIG. 14 illustrates one example of a screen page displayed on a display in a full screen display mode.

First, with reference to FIG. 14, the full screen display mode will be described. FIG. 14 illustrates one example of a screen page displayed on the display 120 (FIG. 4) in the full screen display mode. A screen page is displayed in the full screen display mode as a result of the session being established in step S47 of FIG. 12, and transmission and reception of image data and sound data being started. That is, from among the two display modes, the full screen display mode is a display mode mainly used during a video conference.

In the full screen display mode, the display control unit 17 of the transmission terminal 10 displays all the images transmitted from the respective transmission terminals 10 that have participated in the video conference on the display 120. If one image area becomes smaller as a result of all the images being displayed together, the number of the images corresponding to a predetermined upper limit are displayed.

To the display screen page illustrated in FIG. 14, one first image area 500 that is relatively wide and a plurality of second image areas 510 that are relatively narrow are assigned. For example, in the respective second image areas 510, images expressed by image data transmitted from the respective transmission terminals 10 that have participated in the video conference are displayed. In the first image area 500, an image expressed by image data transmitted from a main transmission terminal 10 from among the transmission terminals 10 that have participated in the video conference is displayed.

For example, the display control unit 17 identifies, as the main transmission terminal 10, a transmission terminal 10 that has transmitted sound data that expresses a voice from among respective received pieces of sound data received from the transmission terminals 10 that have participated in the video conference. Sound data that expresses a voice means sound data determined to have a voice period, as a result of the respective received pieces of sound data being processed to determine whether the respective received pieces of sound data include the voice period. Note that detection of the voice period can be implemented using known technology (for example, see the above-mentioned document "Voice Recognition", written by Yasunaga Niimi, published by Kyoritsu Shuppan Co., Ltd., 1979).

Note that the display screen page illustrated in FIG. 14 is merely one example. In the full screen display mode, it is possible to display respective images in such a manner that all of a plurality of image areas have the same size, display an image of a main transmission terminal 10 throughout the whole area of the display 120, or the like.

Next, the information display mode will be described. As a result of, for example, a user operating an operation button 108 (FIG. 4), it is possible to switch between the two display modes. Note that if the transmission terminal 10 is the information processing terminal 40, it is possible to switch between the two display modes as a result of a hardware key or a software key displayed on a touch panel of the information processing terminal 40, instead of an operation button 108, being pressed or touched.

Figure 15:
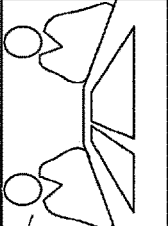
FIG. 15 illustrates one example of a screen page displayed on the display in an information display mode.

FIG. 15 illustrates one example of a screen page displayed on the display 120 (FIG. 4) in the information display mode. As illustrated in FIG. 15, in the information display mode, the display control unit 17 of the transmission terminal 10 displays terminal information that includes at least the terminal names and the terminal IDs of the respective transmission terminals 10 that have participated in the video conference on the display 120.

To the display screen page illustrated in FIG. 15, an image display area 520 for displaying an image, and a terminal information display area 530 for displaying terminal information. For example, in the terminal information display area 530, a list of items of terminal information of the transmission terminals 10 that have participated in the video conference is displayed.

Note that, in the list of items of terminal information, an item of terminal information that does not include a terminal name corresponds a transmission terminal 10 that has not been registered as a candidate for a destination terminal of the transmission terminal 10 that displays the display screen page in the destination list management DB 5004 (FIG. 10).

For example, in the display screen page illustrated in FIG. 15, because the transmission terminal 10db is registered as a candidate for a destination terminal of the transmission terminal 10aa in the destination list management DB 5004, the terminal name is displayed. In contrast thereto, because the transmission terminal 10cb is not registered as a candidate for a destination terminal of the transmission terminal 10aa in the destination list management DB 5004, the terminal name is not displayed.

In the image display area 520, an image expressed by image data of the main transmission terminal 10 from among the transmission terminals 10 that have participated in the video conference is displayed. For example, the display control unit 17 identifies, as the main transmission terminal 10, the transmission terminal 10 that has transmitted sound data that expresses a voice from among the received pieces of sound data from the transmission terminals 10 that have participated in the video conference. Also, the display control unit 17 may identify a selected transmission terminal 10 as the main transmission terminal if the operation input reception unit 12 receives a selection operation for one transmission terminal 10 from among the transmission terminals 10 that have participated in the video conference in response to the corresponding user's operation of a operation button 108. Note that if the transmission terminal 10 is the information processing terminal 40, the information processing terminal 40 identifies the selected transmission terminal 10 as the main transmission terminal 10 as a result of a hardware key or a software key displayed on a touch panel of the information processing terminal 40, instead of an operation button 108, being pressed.

FIG. 16 is a sequence diagram illustrating a terminal information displaying operation of displaying terminal information in the terminal information display area 530 when the transmission terminal 10 has switched the display mode into the information display mode. Note that, in the terminal information displaying operation illustrated in FIG. 16, various sorts of information is transmitted and received in a management information session 3001 (FIG. 2).

First, in step S70, the transmission terminal 10 transmits a terminal information request signal that requests terminal information of the transmission terminals 10 that have participated in the video conference to the transmission management apparatus 50.

In step S71, the terminal status acquisition unit 55 that has received the terminal information request signal of the transmission management apparatus 50 searches the terminal management DB 5003 (FIG. 9B) of the storage unit 5000 using the IP address of the transmission terminal 10 that has transmitted the terminal information request signal as a search key to acquire the terminal ID of the transmission terminal that has transmitted the terminal information request signal.

Next, in step S72, the terminal status acquisition unit 55 searches the terminal management DB 5003 to retrieve the terminal IDs and the terminal names for which the operational statuses are "online (under transmission)". In the present embodiment, the terminal IDs retrieved by the terminal status acquisition unit 55 are "01aa", "01cb", and "01db". Note that the operational status of the transmission terminal having the terminal ID "01aa" is set as "online (under transmission)" in step S43 of FIG. 12 (FIG. 9B).

Next, in step S73, the terminal status acquisition unit 55 searches the destination list management DB 5004 (FIG. 10) of the storage unit 5000 using the terminal ID (in the present embodiment, "01aa") detected in step S71 as a search key to acquire the terminal IDs of candidates for destination terminals of the transmission terminal 10 that has transmitted the terminal information request signal.

For example, assuming that the terminal ID of the transmission terminal 10 that has transmitted the terminal information request signal is "01aa", the terminal IDs retrieved by the terminal status acquisition unit 55 are "01ab", "01ba", and "01db".

Next, in step S74, the terminal status acquisition unit 55 determines whether the respective terminal IDs retrieved in step S72 are included in the terminal ID of the transmission terminal 10 that has transmitted the terminal information request signal and the terminal IDs retrieved in step S73. Concerning the terminal IDs from among the respective terminal IDs retrieved in step S72 determined to be included in the terminal IDs of the transmission terminal 10 that has transmitted the terminal information request signal and the terminal IDs retrieved in step S73, the terminal status acquisition unit 55 causes the transmission and reception unit 51 to transmit the corresponding terminal IDs and terminal names to the transmission terminal 10 that has transmitted the terminal information request signal. In contrast thereto, concerning the terminal IDs from among the respective terminal IDs retrieved in step S72 determined to be not included in the terminal ID of the transmission terminal 10 that has transmitted the terminal information request signal and the terminal IDs retrieved in step S73, the terminal status acquisition unit 55 causes the transmission and reception unit 51 to transmit the corresponding terminal IDs to the transmission terminal 10 that has transmitted the terminal information request signal.

For example, if the transmission terminal 10 that has transmitted the terminal information request signal has the terminal ID "01aa", the terminal IDs "01aa" and "01db" and the terminal names "Japan Tokyo office AA terminal" and "USA Washington office DB terminal" of the transmission terminal 10aa and the transmission terminal 10db, and the terminal ID "01cb" of the transmission terminal 10cb are transmitted to the transmission terminal 10aa that has transmitted the terminal information request signal.

In step S75, the display control unit 17 that has received the response of the transmission terminal 10 displays the corresponding contents in the terminal information display area 530 as illustrated in the display screen page illustrated in FIG. 15.

Displaying the number of bases, and so forth, in the full screen display mode will be described. From the display screen page of the full screen display mode illustrated in FIG. 14, a participant of the video conference can easily know the other participants who have participated in the conference if the number of the transmission terminals 10 that have participated in the conference is small. However, if the number of the transmission terminals 10 that have participated in the conference becomes greater, it is not possible for a participant of the video conference to easily know the other participants who have participated in the conference. This point will now be described with reference to drawings.

Figure 17A:
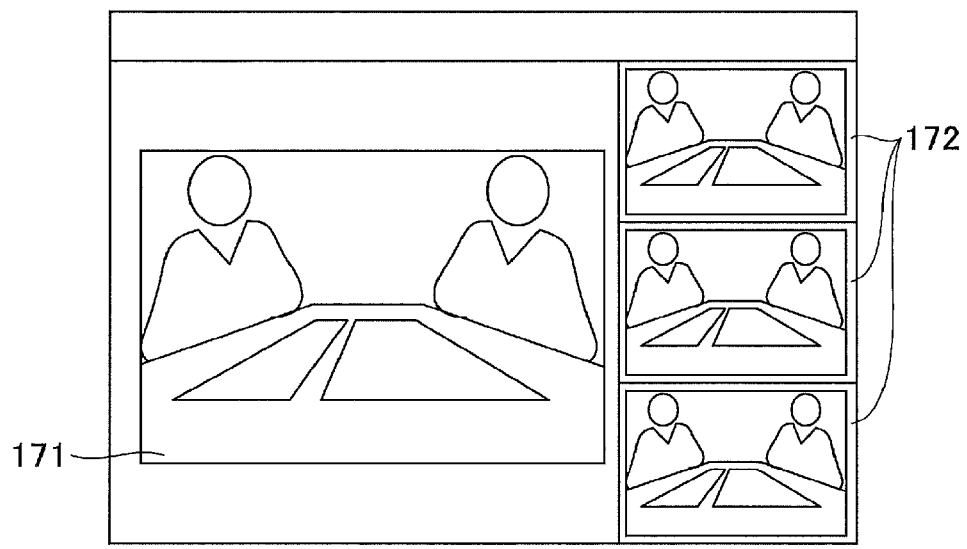
FIG. 17A illustrates one example of a display screen page in the full screen display mode when the number of bases is 4.
Figure 17B:
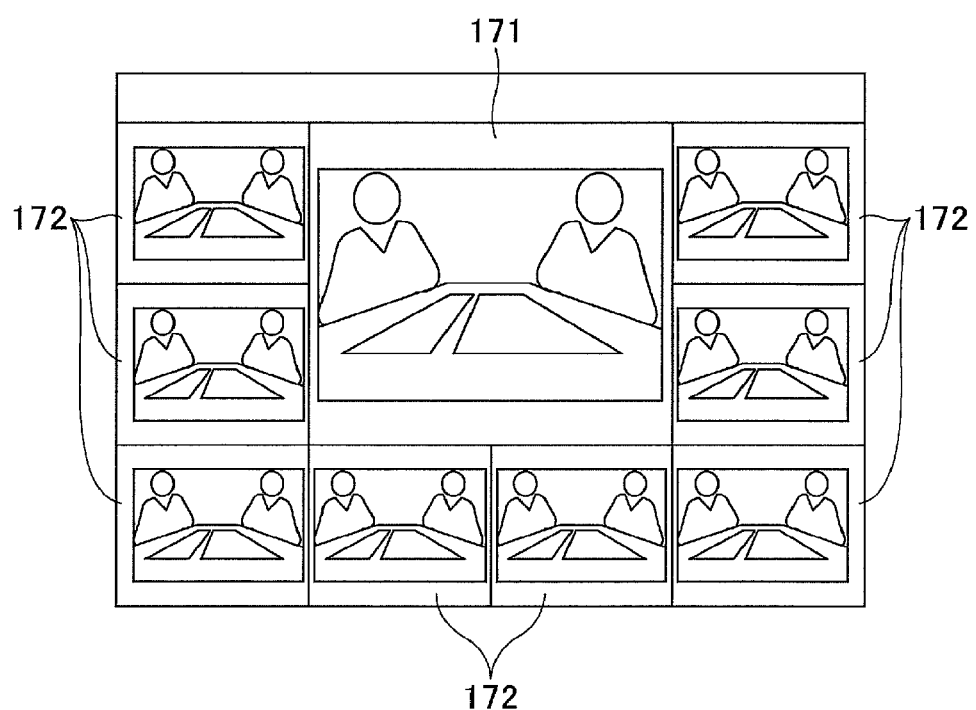
FIG. 17B illustrates one example of a display screen page in the full screen display mode when the number of bases is 9.

FIG. 17A illustrates one example of a display screen page in the full screen display mode when the number of bases is 4. The display screen page of FIG. 17A has a wider first image area 171, and 3 second image areas 172 narrower than the first image area 171. In the same way as FIG. 14, in each second image area 172, images expressed by image data transmitted from the respective transmission terminals 10 that have participated in the video conference are displayed, while in the first image area 171, an image expressed by image data transmitted from the main transmission terminal 10 from among the transmission terminals 10 that have participated in the video conference is displayed. If the number of bases is on the order of 4, it is not impossible for a user to identify a participant from one second image area 172. However, if, as illustrated in FIG. 17B, the number of bases becomes greater, it is difficult for a participant to identify the other participants. FIG. 17B illustrates one example of a display screen page in the full screen display mode when the number of bases is 9.

Further, in consideration of usefulness, it is desired to set an upper limit (referred to as a "display upper limit") for the number of bases that the display 120 displays simultaneously. However, the number of bases (referred to as a "base upper limit") among which transmission terminals 10 can carry out a video conference may not be the same as the display upper limit. If the display upper limit is greater than or equal to the base upper limit, each transmission terminal 10 can display the images of all the bases on the display 120. However, if the display upper limit is less than the base upper limit, it is not possible for some bases to be displayed on the transmission terminal 10.

There is a case where the terminal names and the terminal IDs of the transmission terminals 10 of all the bases can be displayed, as a result of the user operating an operation button 108 (FIG. 4) to switch the display mode into the information display mode as illustrated in FIG. 16. However, in this case, the user is required to perform the operation to implement the switching.

Further, during the information display mode, because the image of one main base is displayed while the images of the other bases are not displayed, it is not possible to know the situations in the other bases.

Therefore, in the transmission terminal 10 according to the present embodiment, the number of bases that have participated in the video conference is displayed while the full screen display mode is kept. Therefore, a participant of a video conference can know the number of bases in a real-time manner while the full screen display mode is kept.

Figure 18:
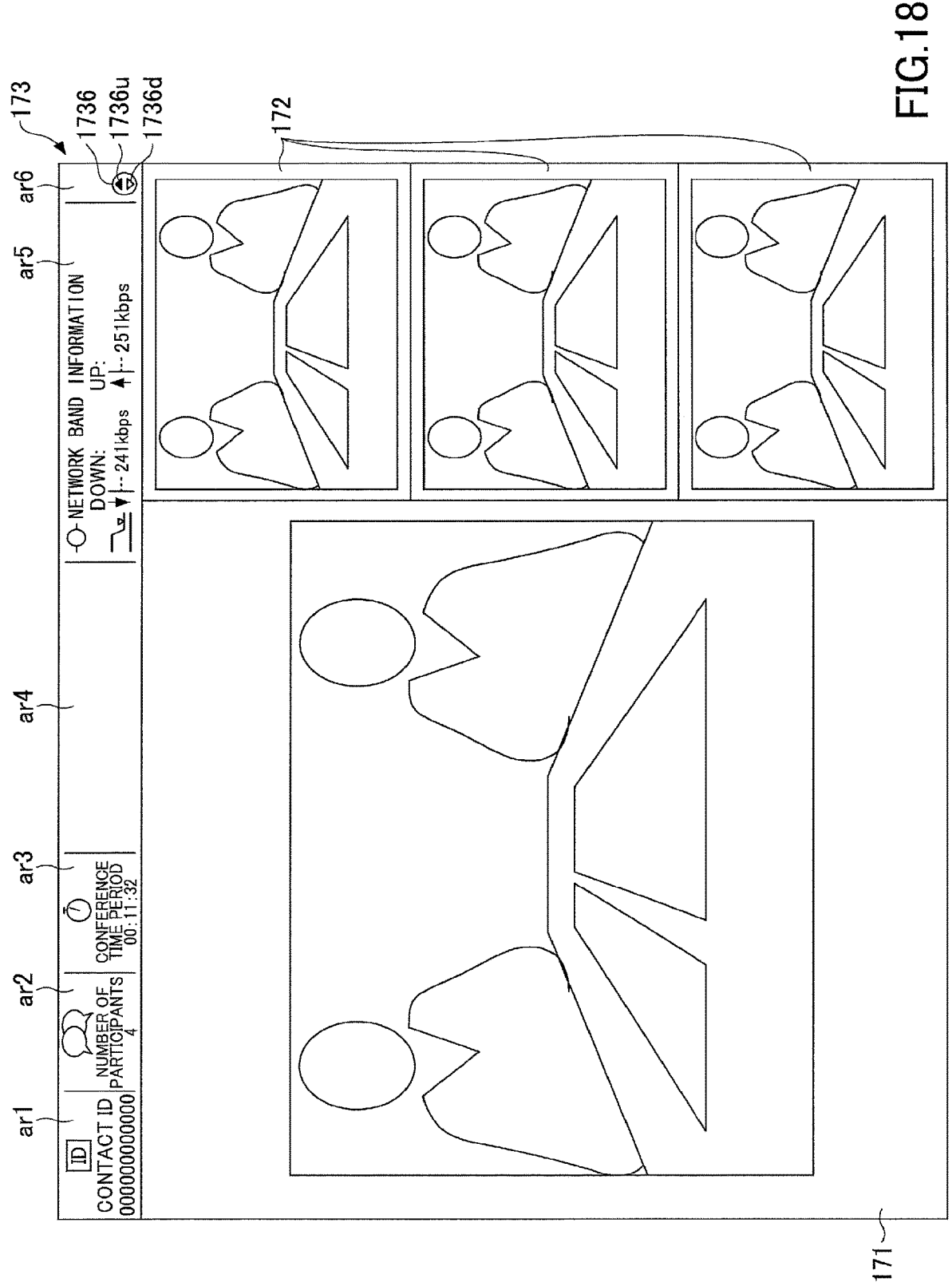
FIG. 18 illustrates one example of a display screen page where the number of bases is displayed in the full screen display mode.

FIG. 18 illustrates one example of a display screen page where the number of bases is displayed in the full screen display mode. In the auxiliary area display unit 18 (FIG. 7) displays the number of bases in an auxiliary area 173 in the full screen display mode. In FIG. 18, the auxiliary area 173 is a belt-like blank space at the top of the display screen page. However, the auxiliary area 173 may be a belt-like blank space at the right end, the left end, or the bottom end of the display screen page, or may be displayed in the image in a superimposing manner.

The auxiliary area 173 is segmented into a first area ar1 through a sixth area ar6. In the first area ar1, the terminal ID of the transmission terminal 10 that displays the display screen page is displayed. A user who wishes to participate in the same video conference as the transmission terminal 10 that displays the display screen page can query the displayed terminal ID, and input the acquired terminal ID from the transmission terminal 10 that the user is operating or select the acquired terminal ID displayed on the transmission terminal 10 that the user is operating to participate in the video conference. In the second area art, the number of bases (the number of the participants) is displayed. In the third area ar3, the period of time elapsed from when the session was established is displayed. In the fourth area ar4, any information can be displayed. In the fifth area ar5, network band information (i.e., respective communications rates in the uplink and the downlink) is displayed. In the sixth area ar6, cursor buttons 1736 are displayed.

The cursor buttons 1736 include an upper triangle button 1736*u* and a lower triangle button 1736*d*. The upper triangle button 1736*u* has a black color while the lower triangle button 1736*d* has a white color. It is possible for the user to operate the upper triangle button 1736*u* but it is not possible for the user to operate the lower triangle button 1736*d*.

Note that it is desirable that the auxiliary area 173 is displayed in a semitransparent manner so that even if image data transmitted and received among the bases overlaps the auxiliary area 173, the visibility can be easily maintained.

Note that the number of bases may be displayed at any one of the first through sixth areas. If the auxiliary area 173 is not segmented, the number of bases may be displayed at any position in the auxiliary area 173. However, as a result of the auxiliary area 173 being segmented, visibility of the user for the display screen page is improved.

The cursor buttons 1736 in the sixth area ar6 are icons for the user to indicate that it is possible to switch into an auxiliary area 173 in a simple display manner by operating an operation button 108 (FIG. 2) of the transmission terminal 10. Hereinafter, the auxiliary area 173 of FIG. 18 will be referred to as an "auxiliary area 173 in a standard manner" to distinguish the auxiliary areas 173 in the two display manners.

That is, according to an initial setting of the transmission terminal 10, the various sorts of information of the first area ar1 through the sixth area ar6 of FIG. 18 is displayed in the auxiliary area 173. However, the user can switch the auxiliary area 173 in the standard manner into the auxiliary area 173 in the simple display manner, and thereafter, the user can perform such a setting as to not display the auxiliary area 173, by operating an operation button 108 (or operating a touch panel or the like) to press the upper triangle button 1736*u*. Details will be described with reference to FIG. 24.

Note that if the transmission terminal 10 is the information processing terminal 40, it is possible to not display the various sorts of information of the first area ar1 through the sixth area ar6 in the auxiliary area 173 as a result of a hardware key or a software key displayed on a touch panel of the information processing terminal 40, instead of the operation button 108, being pressed.

In FIG. 18, images of 4 bases are displayed on the display 120. Therefore, the number of bases in the second area ar2 is "4". The user can know that the number of bases that have participated in the video conference at a glance.

Figure 19:
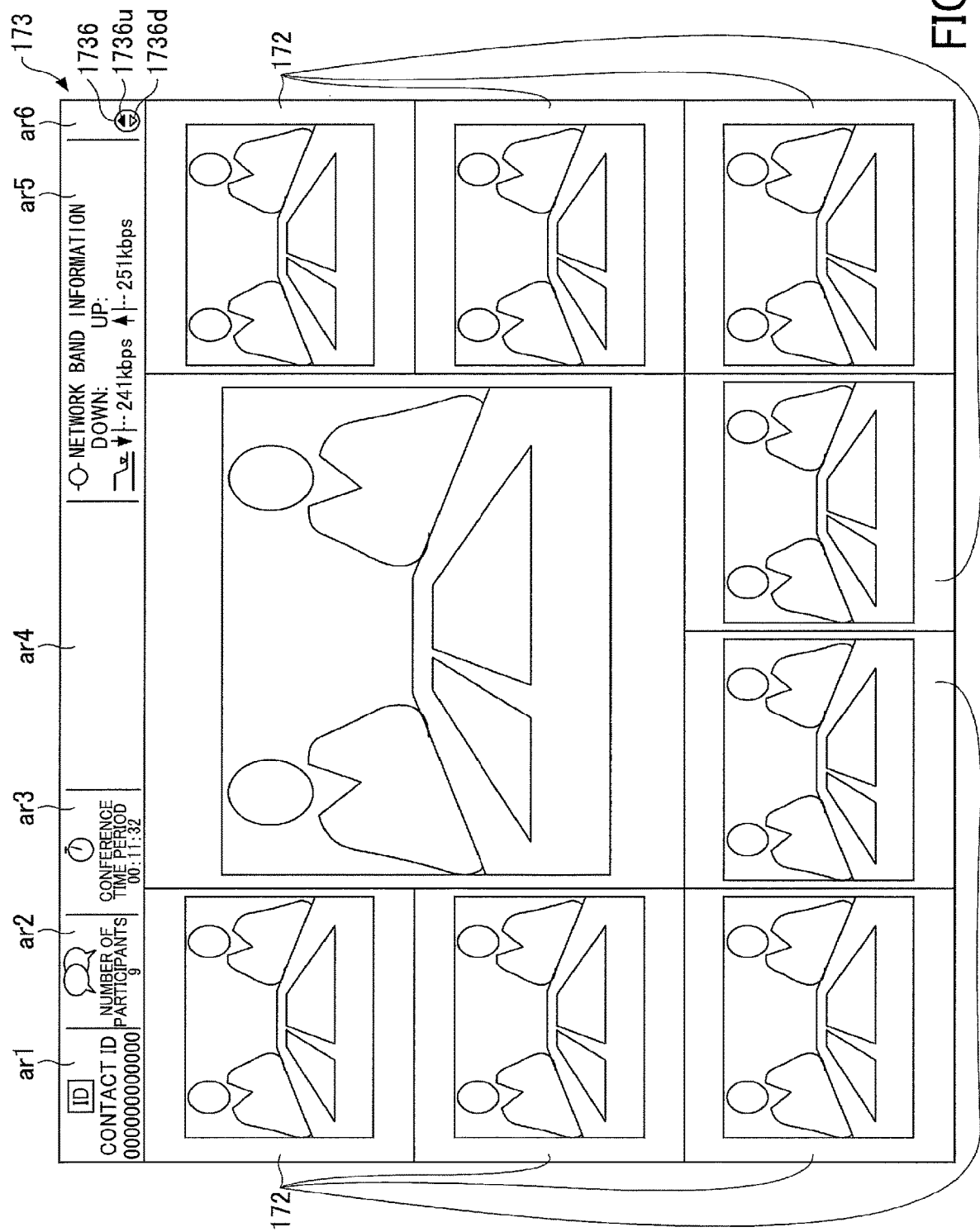
FIG. 19 illustrates another example of a display screen page where the number of bases is displayed in the full screen display mode.

FIG. 19 illustrates another example of a display screen page where the number of bases is displayed in the full screen display mode. In FIG. 19, the same elements as the elements of FIG. 18 have the same or similar functions, and therefore, different points will be described.

In FIG. 19, the display screen page is divided into nine areas. Also, the number of second areas ar2 is "9". Therefore, even if the number of bases increases, the user can know the number of bases that have participated in the video conference at a glance.

For the sake of convenience of description, it is assumed that the display upper limit in the transmission terminal 10 is "9". When the display upper limit in the transmission terminal 10 is "9", 10 or more transmission terminals 10 may be participating in the video conference. In this case, the transmission terminal 10 keeps the number of images displayed in the full screen display mode as "9" as it is, while the transmission terminal 10 displays the number of transmission terminals 10 that have participated in the video conference in the second area ar2 as the number of bases.

Figure 20:
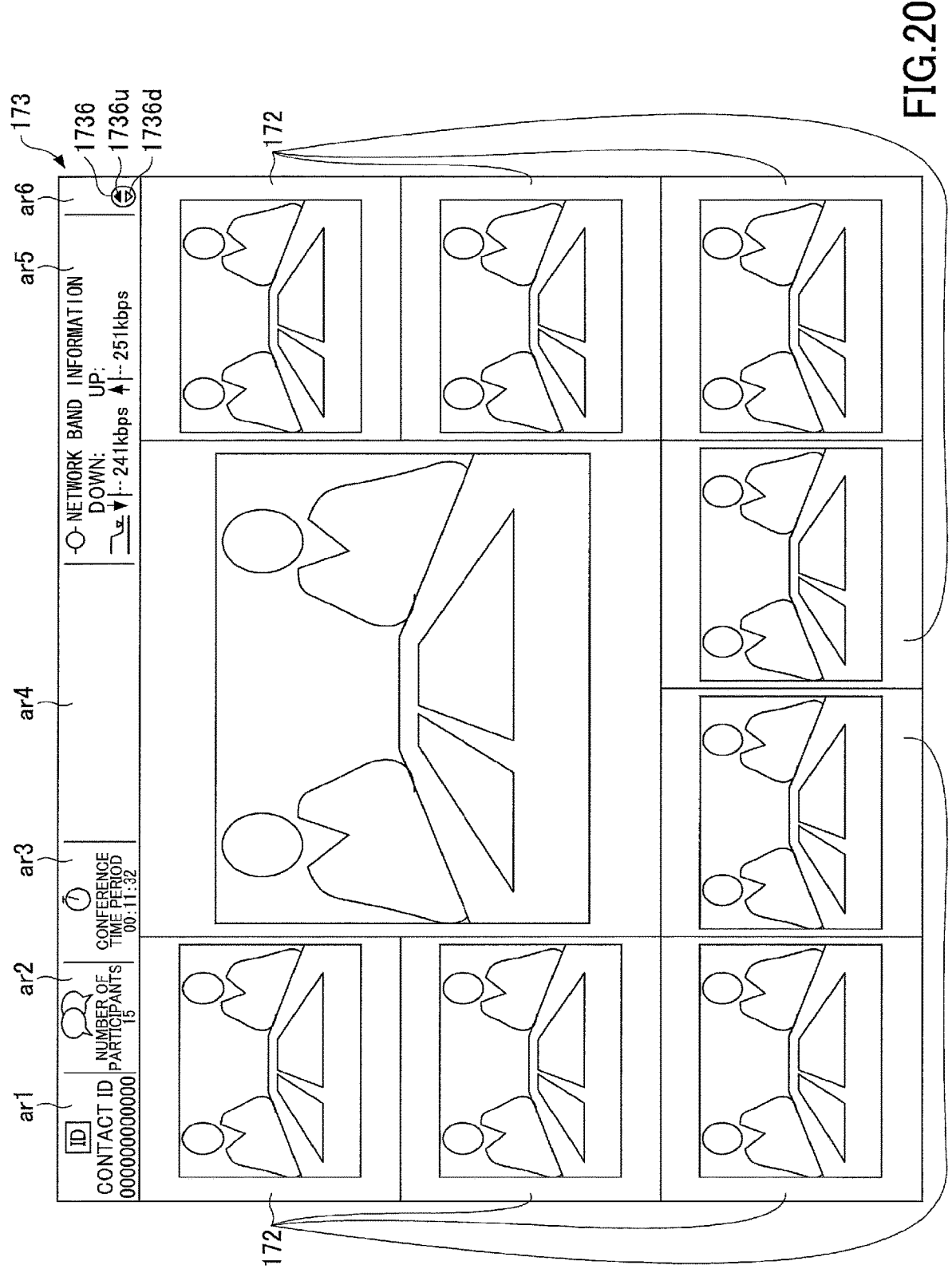
FIG. 20 illustrates one example of a display screen page where the number of images displayed in the full screen display mode is different from the number of bases displayed in a second area.

FIG. 20 illustrates one example of a display screen page where the number of images displayed in the full screen display mode is different from the number of bases displayed in the second area ar2. In FIG. 20, while the number of images displayed in the full screen display mode is "9", the number of bases displayed in the second area ar2 is "15". Thus, even when the number of bases that have participated in a video conference exceeds the display upper limit, the user can know the number of bases that have participated in the video conference at a glance.

The layout (i.e., the arrangement) in the auxiliary area 173 is prescribed in the layout information 2000L (FIG. 7) stored in the storage unit 2000 of the UI providing apparatus 20. The layout information 2000L is described based on a language or a standard such as HTML, JavaScript (registered trademark), XML, CSS, or the like.

According to the layout information 2000L, the position of the auxiliary area 173, the manner that the auxiliary area 173 is segmented into the first area through the sixth area having respective fixed sizes, and respective items of information displayed in the first area ar1 through the sixth area ar6 are determined. Therefore, the transmission terminal 10 that has acquired the layout information 2000L from the UI providing apparatus 20 can set various sorts of information in the first area ar1 through the sixth area ar6, and display the information in the first area ar1 through the sixth area ar6.

As illustrated in FIGS. 17A and 17B, and so forth, the arrangement (layout) in which the transmission terminal 10 displays image data received from the destination terminals on the display 120 in the full screen display mode is previously determined depending on the number of bases, and so forth. In contrast thereto, the layout information 2000L is defined separately from the layout of image data. Therefore, it is possible to determine information to be arranged in the auxiliary area 173 and the arrangement in the auxiliary area 173 without being influenced by the layout of image data. That is, the transmission terminal 10 can display the first area ar1 through the sixth area ar6 in the auxiliary area independently from image data, and therefore, even if the layout of image data is changed, the auxiliary area 173 is not influenced by the change.

Figure 21:
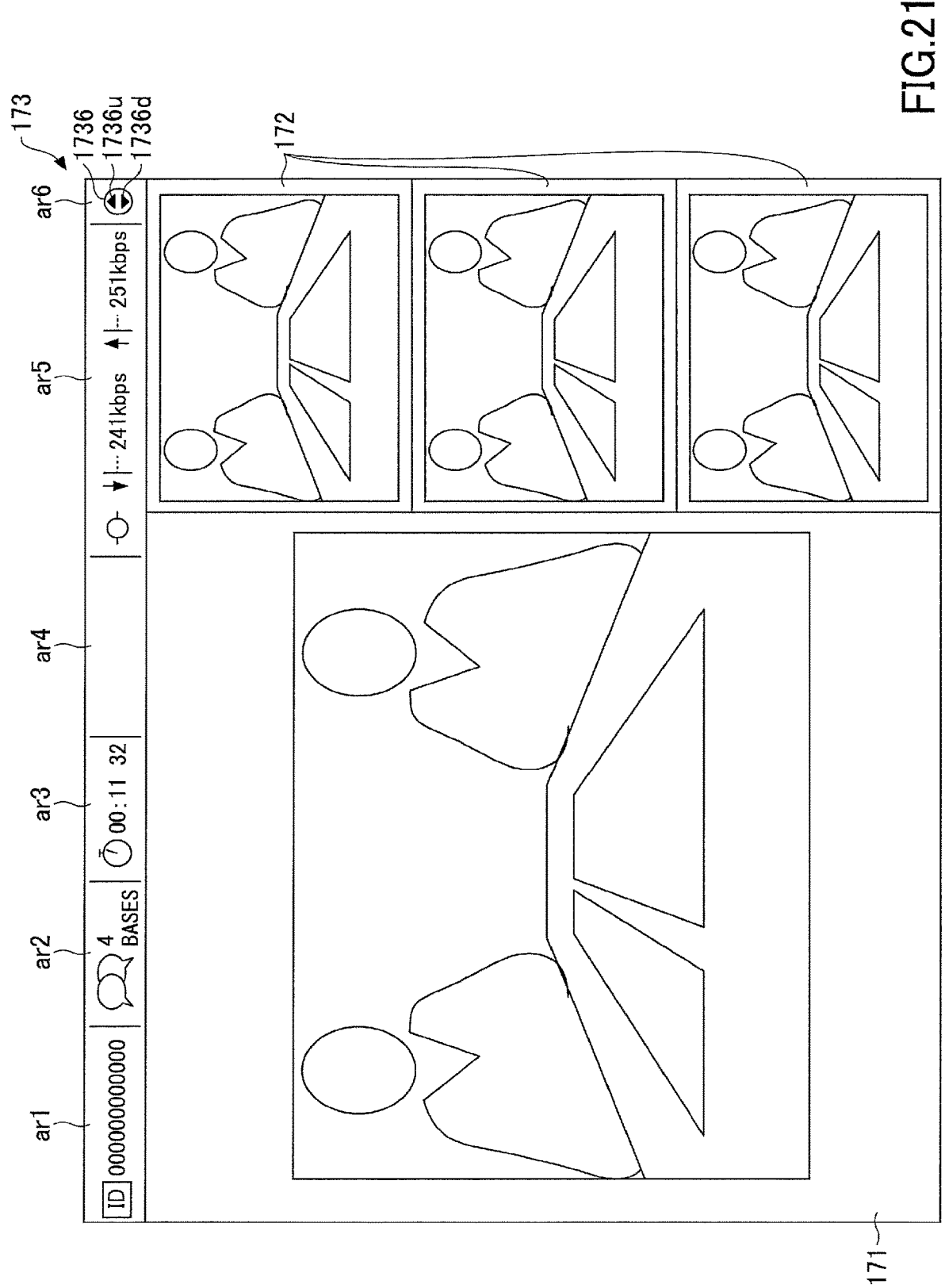
FIG. 21 illustrates one example of an auxiliary area in a simple display manner.

FIG. 21 illustrates one example of the auxiliary area 173 in the simple display manner. In FIG. 21, the number of bases is the same as FIG. 18. However, information concerning transmission statuses in the first through sixth areas ar1 through ar6 is displayed in a simplified manner.

In the auxiliary area 173 in the simple display manner, information concerning what is displayed in each area is not displayed, and, mainly, the first area ar1 displays the contact ID, the second areas art displays the number of bases, the third area displays the clock time, and the fifth area ar5 displays the band.

The cursor buttons 1736 in the sixth area ar6 are changed in the form from the auxiliary area 173 in the standard manner. In the auxiliary area 173 in the simple display manner, each of both the upper triangular button 1736u and the lower triangular button 1736d has a black color. The user can operate either one of the upper and lower triangular buttons. The lower triangular button is used to switch the form of the auxiliary area 173 into the standard manner. The upper triangular button is used to not display the auxiliary area 173 in the simple display manner (not display the auxiliary area 173 in the standard manner either).

The area occupied by the auxiliary area 173 in the simple display manner in the display 120 is reduced from the auxiliary area 173 in the standard manner, and therefore, it is possible to improve the visibility of image data while displaying the information of transmission statuses in the auxiliary area 173.

Note that it is desirable that also the auxiliary area 173 in the simple display manner is displayed in a semitransparent manner the same as the auxiliary area 173 in the standard manner.

Figure 22:
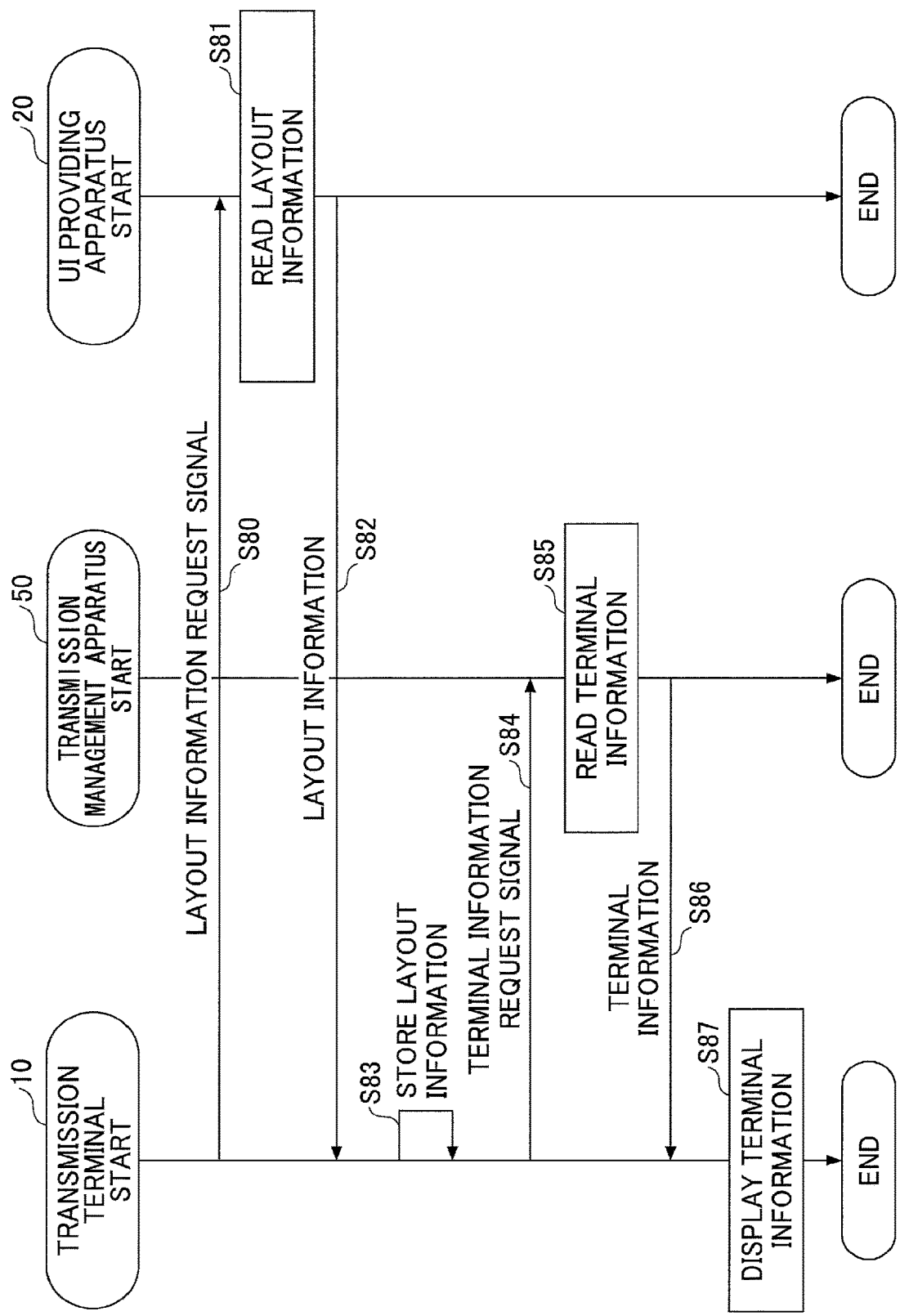
FIG. 22 is one example of a sequence diagram illustrating a procedure in which the transmission system displays the number of bases when a transmission terminal is in the full screen display mode.

FIG. 22 is one example of a sequence diagram illustrating a procedure in which the transmission system 1 displays the number of bases when the transmission terminal 10 is in the full screen display mode. The procedure of FIG. 22 is carried out after the session is established in step S47 of FIG. 12 even when the user does not operate the operation button 108 (FIG. 4) or the like. That is, in the transmission terminal 10, an initial setting to display the auxiliary area 173 has been set.

The procedure of FIG. 22 may also be carried out as a result of, after the session is established in step S47, the user pressing an operation button 108. Note that, in this regard, if the transmission terminal 10 is the information processing terminal 40, the procedure of FIG. 22 is carried out as a result of a hardware key or a software key displayed on a touch panel of the information processing terminal 40, instead of the operation button 108, being pressed.

Figure 11:
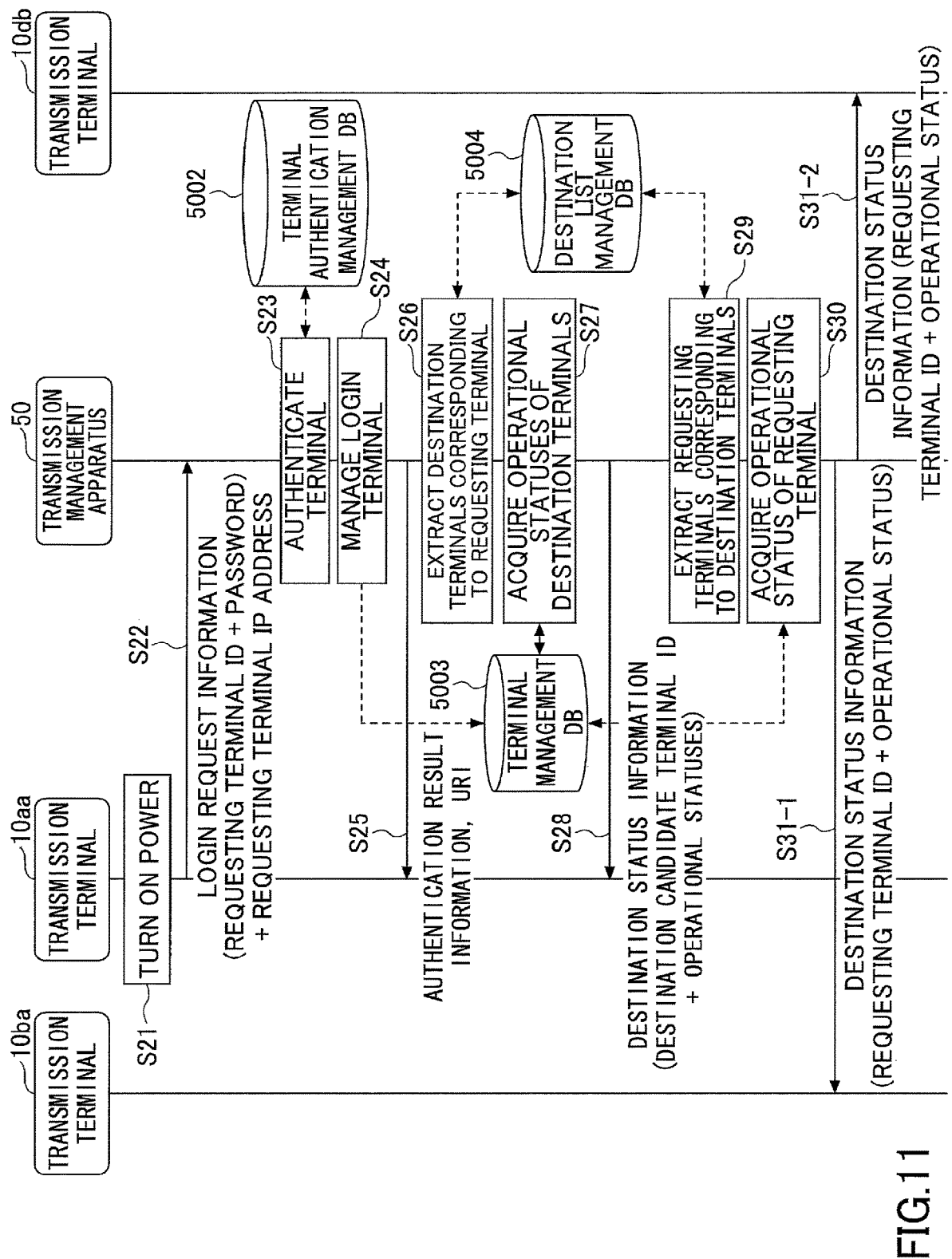
FIG. 11 is one example of a sequence diagram illustrating a preparation stage operation carried out until a transmission terminal enters a preparation state for participating in a video conference.

First, in step S80, the transmission terminal 10 designates the URI of the UI providing apparatus 20 acquired in step S25 of FIG. 11 to transmit a layout information request signal (one example of an arrangement information request) for requesting the layout information 2000L to the UI providing apparatus 20. Note that, instead of acquiring the URI of the UI providing apparatus 20 in step S25 of FIG. 11, the URI of the UI providing apparatus 20 may be acquired, for example, by the transmission terminal 10 from the transmission management apparatus 50 immediately before step S80, or by the user pressing an operation button 108. Note that if the transmission terminal 10 is the information processing terminal 40, the URI of the UI providing apparatus 20 is acquired as a result of a hardware key or a software key displayed on a touch panel of the information processing terminal 40, instead of the operation button 108, being pressed.

In step S81, the transmission and reception unit 21 of the UI providing apparatus 20 receives the layout information request signal, and, as a result, the server unit 22 reads the storage unit 2000 based on the designated URI to acquire the layout information 2000L.

Next, in step S82, the server unit 22 transmits the layout information 2000L that has been read through the transmission and reception unit 21 to the transmission terminal 10 that has transmitted the layout information request signal. The layout information includes respective items of layout information of the auxiliary area 173 in both the standard manner and the simple display manner.

In step S83, the transmission and reception unit 11 of the transmission terminal 10 stores the layout information 2000L in a volatile memory. The volatile memory is, for example, the RAM 103. That is, by storing the layout information 2000L that has been acquired once in the transmission terminal 10, it is not necessary to again acquire the layout information 2000L from the UI providing apparatus 20 during the power being supplied. Therefore, even if the transmission terminal 10 again displays the auxiliary area 173 after having removed the auxiliary area 173 once, the transmission terminal 10 can read the layout information 2000L from the volatile memory of the transmission terminal 10. Therefore, it is possible to eliminate a processing time to acquire the layout information 2000L, and as a result, a time for displaying the auxiliary area 173 can be reduced. Also, as a result of the layout information 2000L being stored in a volatile memory, the layout information 2000L is deleted as a result of the power being turned off in the transmission terminal 10. Thus, it is possible to prevent the layout information 2000L from being leaked from the transmission terminal 10.

Next, in step S84, the auxiliary area display unit 18 of the transmission terminal 10 (FIG. 7) transmits a terminal information request signal to the transmission management apparatus 50. The terminal information request signal is a signal to request the number of the transmission terminals 10 which have participated in the video conference.

In step S85, the transmission and reception unit 51 of the transmission management apparatus 50 receives the terminal information request signal, and, as a result, the terminal status acquisition unit 55 searches the terminal management DB 5003 to calculate the number of terminal IDs for which the operational statuses are "online (under transmission)". That is, the terminal status acquisition unit 55 identifies the terminal management table 5003T (FIG. 9B) that registers the IP address of the transmission terminal 10 that has transmitted the terminal information request signal, and identifies all of the terminal IDs for which the operational statuses are "online (under transmission)" from the identified terminal management table 5003T to acquire the number of the terminal IDs. According to the present embodiment, the terminal status acquisition unit 55 detects the terminal IDs, i.e., "01aa", "01cb", and "01db". Thus, the number of the terminal IDs is "3". Note that the operational status of the transmission terminal 10aa that has the terminal ID "01aa" is set to be "online (under transmission)" in step S43 of FIG. 12.

Note that it is possible to acquire the number of the transmission terminals 10 of "online (transmission possible)" in addition to the number of transmission terminals 10 of "online (under transmission)". As a result, each transmission terminal 10 can display the number of the transmission terminals 10 that have logged in on the display 120. It is also possible to separately acquire the number of the transmission terminals 10 of "online (under transmission)", and the number of the transmission terminals 10 of "online (transmission possible)", and each transmission terminal 10 can display these numbers separately on the display 120. As a result, it is possible to know that there are users who have not participated in the conference if these numbers are not the same as one another, for example. Next, in step S86, the terminal status acquisition unit 55 transmits, through the transmission and reception unit 51, the acquired number of the terminal ID of "online (under transmission)" to the transmission terminal 10 that has transmitted the terminal information request signal.

Note that the terminal status acquisition unit 55 may transmit the terminal IDs of "online (under transmission)" also to other transmission terminals 10 than the transmission terminal 10 that has transmitted the terminal information request signal. For example, after the number of the terminal IDs of online is transmitted to the transmission terminal 10aa that has the terminal ID "01aa" in step S86, the number of the terminal IDs of online may be transmitted also to the transmission terminals 10cb and 10db that have the terminal IDs "01cb" and "01db". Thereby, each of the transmission terminals 10cb and 10db having the terminal IDs "01cb" and "01db" can display the number of the bases in the auxiliary area 173, as a result of receiving the layout information 2000L.

In step S87, the transmission and reception unit 11 of the transmission terminal 10 receives the number of the terminal IDs of "online (under transmission)", and the auxiliary area display unit 18 displays the number on the display 120. That is, the auxiliary area display unit 18 interprets the layout information 2000L to determines a position of the auxiliary area 173 and a layout of the first area ar1 through the sixth area ar6, sets the respective items of information in the first area ar1 through the sixth area ar6, and displays the information on the display 120.

The terminal ID of the transmission terminal 10 itself in the first area ar1 has been stored in the storage unit 1000. The number of bases in the second area art is transmitted from the transmission management apparatus 50. The period of time elapsed from when the session has been established in the third area ar3 is measured by the transmission terminal 10 after the session has been established. Information in the fourth area ar4 is, for example, information that the transmission terminal 10 or the transmission management apparatus 50 has. Information concerning a network band in the fifth area ar5 is displayed in such a manner that the transmission terminal 10 measures the communications rate between the transmission terminal 10 and the relay apparatus 30 periodically or in a real-time manner, and displays the measured rate. The cursor buttons 1736 in the sixth area ar6 are image data such as previously determined icons.

Note that the displayed auxiliary area 173 can be removed as a result of the user operating an operation button 108. Also, the displayed auxiliary area 173 can be again displayed as a result of the user operating an operation button 108.

Thus, the transmission terminal 10 can display the number of bases which have participated in the video conference without entering an information display mode. Therefore, the user need not operate an operation button 108, or the like. Because the transmission terminal 10 is kept in the full screen display mode, the user can know the number of bases while seeing images of the respective bases. Even if the number of bases that have participated in the video conference exceeds the display upper limit, the user can accurately know the number of bases.

The user is allowed to set either one of a manner to "display in response to being operated" the auxiliary area 173 or a manner to "remove after elapse of certain period of time" the once displayed auxiliary area 173 to the transmission terminal 10.

Figure 23:
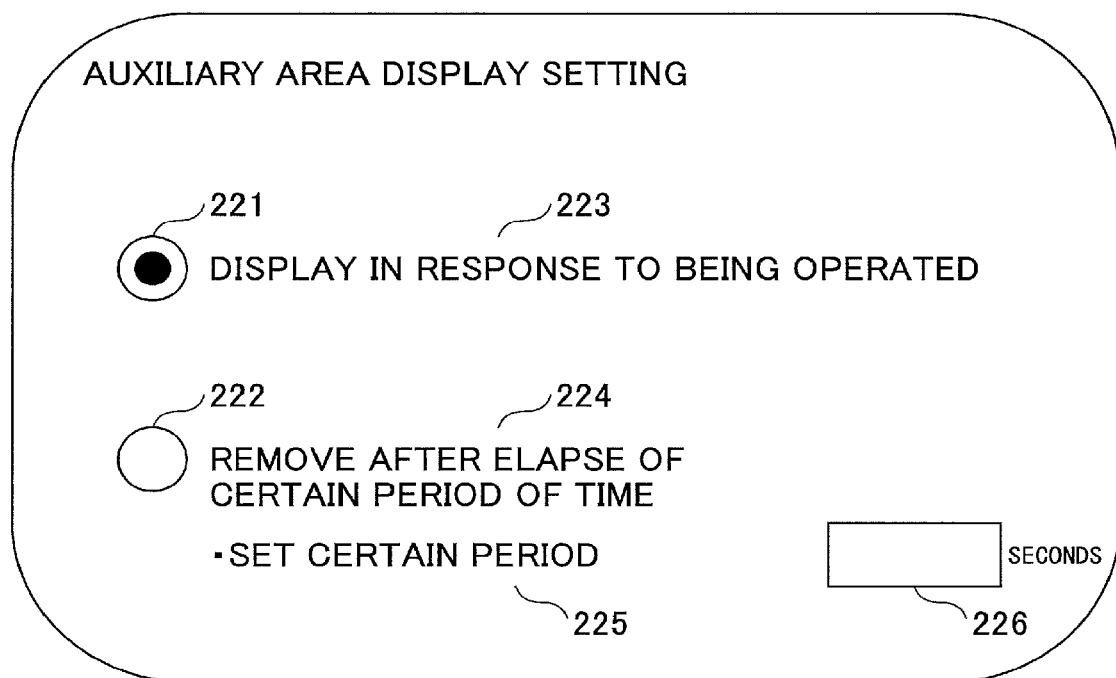
FIG. 23 illustrates one example of a screen page from which a user performs a setting to display an auxiliary area.

FIG. 23 illustrates one example of a screen page from which the user performs a setting to display the auxiliary area 173. The screen page of FIG. 23 is displayed on the display 120 in response to the user operating, for example, an operation button 108. The screen page of FIG. 23 includes two radio buttons 221 and 222, a message 223 "display in response to being operated" associated with the radio button 221, and a message 224 "remove after elapse of certain period of time" associated with the radio button 222. The user can select either one of the two radio buttons 221 and 222.

If the radio button 221 is selected, the transmission terminal 10 continuously displays the auxiliary area 173. Then, as illustrated in FIG. 24, the transmission terminal 10 displays the auxiliary area 173 in the standard manner and the auxiliary area 173 in the simple display manner alternately, or displays none of the auxiliary area 173 in the standard manner and the auxiliary area 173 in the simple display manner, according to an operation of the user.

If the radio button 222 is selected, the transmission terminal 10 removes the auxiliary area 173 after displaying the auxiliary area 173 for a certain period of time, and again displays the auxiliary area 173 in response to a detection of a trigger to again display the auxiliary area 173. Also in this case, the user may display or remove the auxiliary area 173 by performing an operation as one example of the trigger.

If the radio button 222 is selected, a message "set certain period" 225 becomes visible, and also, the user is allowed to set a numeral in a time period setting field 226. The user can set a period of time for which the auxiliary area 173 will be displayed and will be removed thereafter in the time period setting field 226. Before the user sets the period of time, a certain initial value has been set. The user of the transmission terminal 10 can set any period of time in the time period setting field 226. An upper limit and a lower limit may be prescribed to limit a period of time that can be set in the time period setting field 226.

Figure 24:
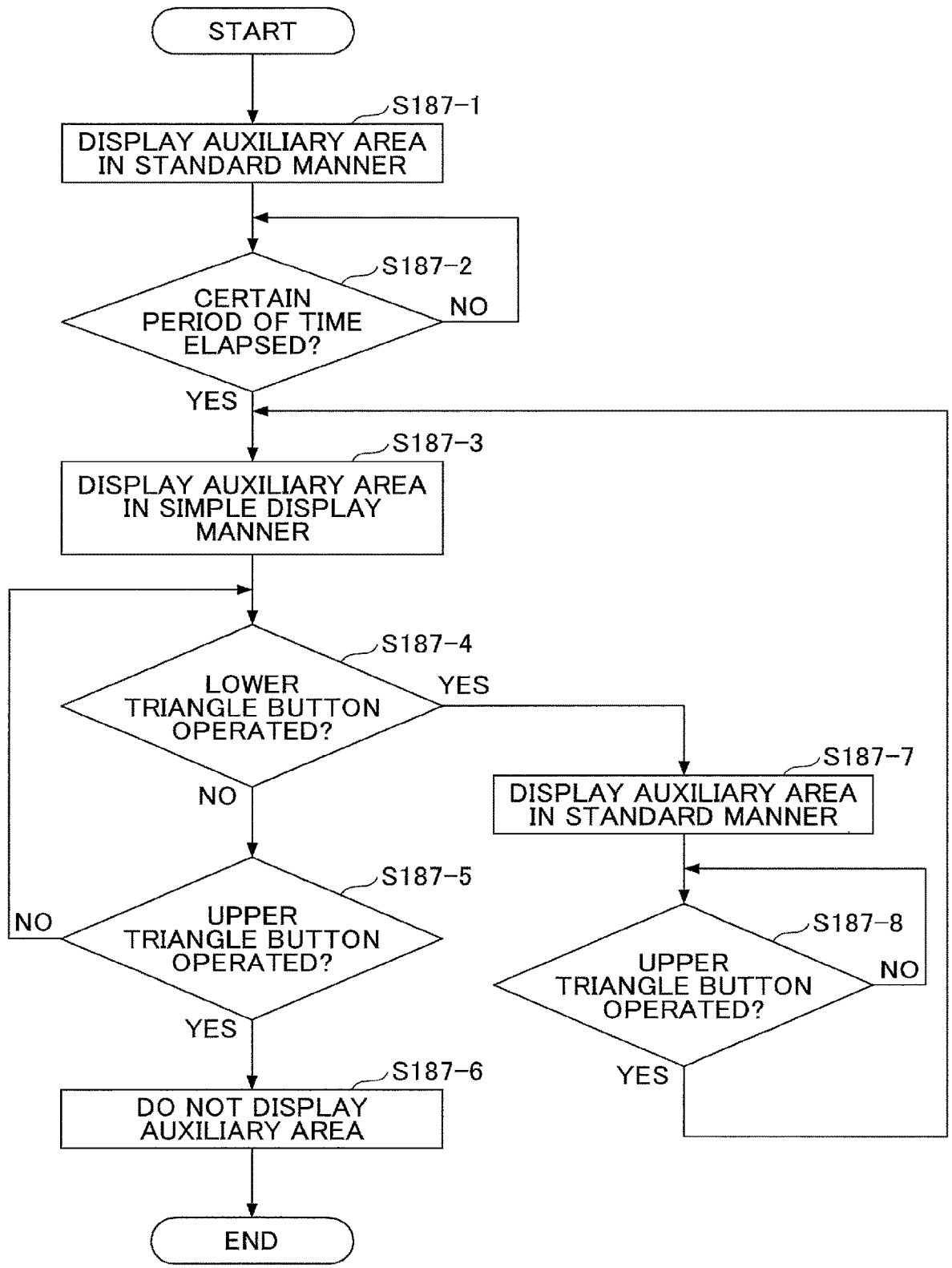
FIG. 24 is one example of a flowchart illustrating an operation procedure to switch between the auxiliary area in a standard manner and the auxiliary area in a simple display manner carried out by a transmission terminal when "display in response to being operated" is selected.

FIG. 24 is one example of a flowchart illustrating a switching operation between the auxiliary area 173 in the standard manner and the auxiliary area 173 in the simple display manner carried out by the transmission terminal 10 when the above-mentioned manner "display in response to being operated" is selected.

In step S187-1, the process of FIG. 24 is started when the auxiliary display unit 18 starts displaying the auxiliary area 173 in the standard manner in step S87 of FIG. 22.

In step S187-2, the auxiliary display unit 18 determines whether a certain period of time has elapsed, after displaying the auxiliary area 173 in the standard manner. The certain period of time may be previously determined, or the certain period of time that is set in FIG. 23 when the manner "remove after elapsed of certain period of time" is selected may be used. Also, the certain period of time may be set by the user separately from the certain period of time that is set in FIG. 23.

After the certain period of time has elapsed (Yes in step S187-2), the auxiliary display unit 18 switches the auxiliary area 173 in the standard manner into the auxiliary area 173 in the simple display manner in step S187-3. The cursor buttons 1736 in the auxiliary area 173 in the simple display manner are such that both the upper and lower triangular buttons 1736*u* and 1736*d* have black colors, and therefore, it is possible to allow the user to understand that the screen page will be changed by pressing either one of the triangular buttons is pressed.

The auxiliary display unit 18 determines whether the lower triangular button 1736*d* has been operated, in S187-4.

If the lower triangular button 1736*d* has been operated (Yes in step S187-4), the auxiliary display unit 18 switches the auxiliary area 173 in the simple display manner into the auxiliary area 173 in the standard manner in step S187-7. In the auxiliary area 173 in the standard manner, the lower triangular button 1736*d* has a white color, and therefore, it can be suggested that nothing occurs if the lower triangular button 1736*d* is pressed. The upper triangular button 1736*u* has a black color, and therefore, it can be suggested that the auxiliary area 173 in the simple display manner will be displayed again if the upper triangular button 1736*u* is pressed. Also, because the auxiliary area 173 in the standard manner is displayed in a semitransparent manner, it is possible to continue the conference without degrading the visibility of image data as much as possible.

If the lower triangular button 1736*d* has not been operated (No in step S187-4), the auxiliary display unit 18 determines whether the upper triangular button 1736*u* has been operated in step S187-5. Note that the determination as to whether the lower triangular button 1736*d* has been operated and the determination as to whether the upper triangular button 1736*u* has been operated may be carried out in any order.

If the upper triangular button 1736*u* has been operated (Yes in step S187-5), the auxiliary display unit 18 does not display the auxiliary area 173 in step S187-6. That is, the auxiliary display unit 18 displays none of the auxiliary area 173 in the simple display manner and the auxiliary area 173 in the standard manner. Thereafter, the auxiliary display unit 18 may display the auxiliary area 173 in the simple display manner (i.e., the process may return to step S187-3) in response to the lower triangular button 1736*d* being operated. Note that such a design can be made that nothing occurs even if the upper triangular button 1736*u* is operated, or the auxiliary area 173 in the standard manner is displayed in response to the operation. It is also possible to be able to carry out such control that the auxiliary display unit 18 displays none of the auxiliary area 173 in the simple display manner and the auxiliary area 173 in the standard manner, but displays the cursor buttons 1736, and returns to step S187-3.

If, in step S187-7, the auxiliary area 173 in the standard manner is displayed, the auxiliary display unit 18 determines whether the upper triangular button 1736*u* has been operated, in step S187-8.

If the upper triangular button 1736*u* has been operated (Yes in step S187-8), the auxiliary display unit 18 switches the auxiliary area 173 in the standard manner into the auxiliary area 173 in the simple display manner in step S187-3.

Thus, the user can switch the display mode of the auxiliary area by operating the cursor buttons 1736.

Next, operations of the transmission management apparatus 50 and the transmission terminal 10 after the transmission terminal 10 displays the auxiliary area 173 in step S87 of FIG. 22 will now be described.

Figure 25:
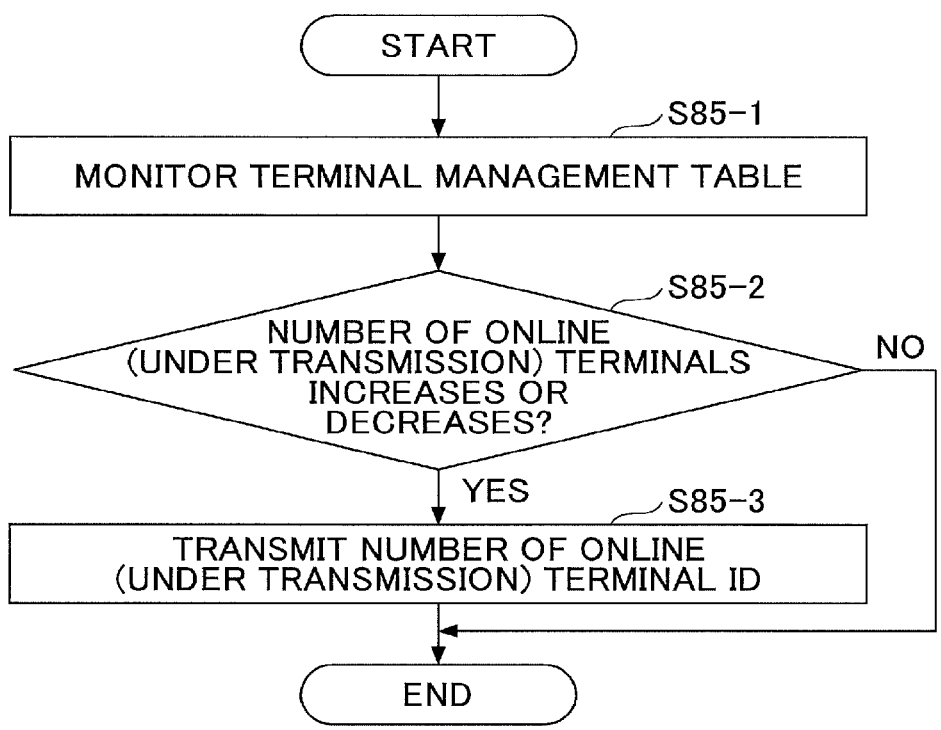
FIG. 25 is one example of a flowchart illustrating an operation procedure of the transmission management apparatus.

FIG. 25 is one example of a flowchart illustrating operations of the transmission management apparatus 50. A process of FIG. 25 is, for example, carried out repetitiously after the transmission management apparatus 50 calculates the number of the online terminal IDs in step S85 of FIG. 22.

In step S85-1, the terminal status acquisition unit 55 (FIG. 7) monitors the terminal management table 5003T in which the IP address (or the terminal ID) of the transmission terminal 10 that has transmitted the terminal information request signal is registered.

In step S85-2, the terminal status acquisition unit 55 determines whether the number of the terminal IDs of "online (under transmission)" transmitted in step S85 of FIG. 22 has increased or decreased.

If the determination result in step S85-2 is NO, the process of FIG. 25 is once ended, and the process is then repetitiously carried out from step S85-1.

If the determination result in step S85-2 is YES, this means that the number of bases has changed. Therefore, in step S85-3, the terminal status acquisition unit 55 transmits the number of terminal IDs each of which currently has the operational status "online (under transmission)" to the transmission terminal 10. Therefore, the transmission terminal 10 that has once acquired the number of the terminal IDs of "online (under transmission)" can acquire the correct number of bases at any time.

Also in FIG. 25, the terminal status acquisition unit 55 may transmit the number of the terminal IDs of "online (under transmission)" also to the transmission terminals 10 of "online (under transmission)" other than the transmission terminal 10 that has transmitted the terminal information request signal. Thereby, all the transmission terminals 10 of online can have the correct number of bases at any time.

Figure 26:
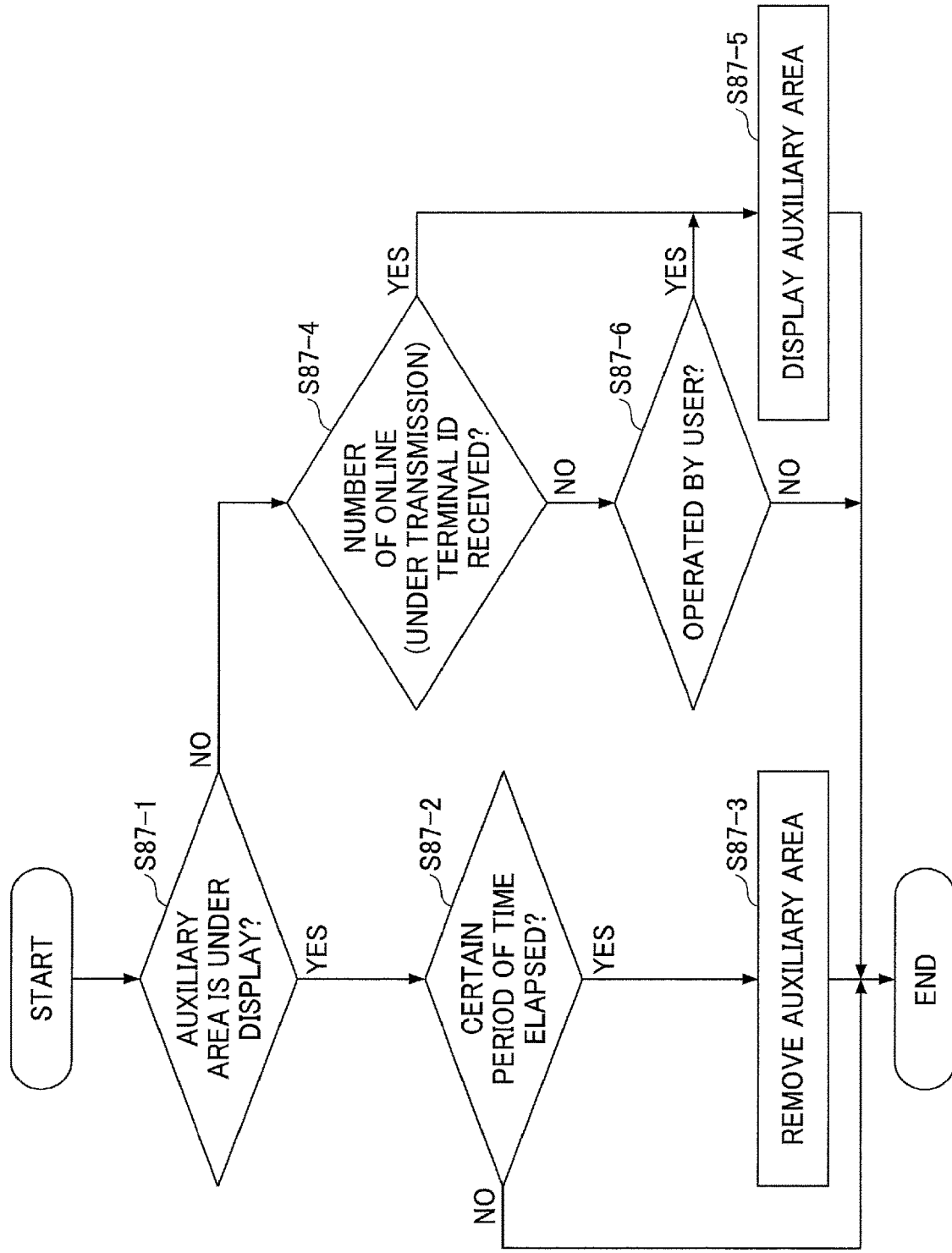
FIG. 26 is one example of a flowchart illustrating an operation procedure of a transmission terminal.

FIG. 26 is one example of a flowchart illustrating an operation procedure of the transmission terminal 10. The process of FIG. 26 is, for example, repetitiously carried out after the transmission terminal 10 displays the auxiliary area 173 in step S87 of FIG. 22. FIG. 26 now will be described assuming a case where a setting is made to select the manner "remove after elapse of certain period of time" the once displayed auxiliary area 173.

First, in step S87-1, the auxiliary area display unit 18 (FIG. 7) determines whether the auxiliary area display unit 18 is currently displaying the auxiliary area 173.

If the determination result in step S87-1 is YES, the auxiliary area display unit 18 determines in step S87-2 whether the period of time that has elapsed from when the auxiliary area display unit 18 starts displaying the auxiliary area 173 exceeds the certain period of time.

If the determination result of step S87-2 is YES, the auxiliary area display unit 18 removes the auxiliary area 173 in step S87-3. Therefore, the participant can participate in the video conference while paying attention mainly to the images of the respective bases.

If the determination result of step S87-2 is NO, the auxiliary area display unit 18 keeps displaying the auxiliary area 173.

If the determination result of step S87-1 is NO, the auxiliary area display unit 18 determines whether a trigger to display the auxiliary area 173 occurs. The trigger is a case where the auxiliary area display unit 18 has received the number of the terminal IDs of "online (under transmission)" from the transmission management apparatus 50, or a case where the user has performed an operation to display the auxiliary area 173.

First, in step S87-4, the auxiliary area display unit 18 determines whether the auxiliary area display unit 18 has received the number of the terminal IDs of "online (under transmission)" from the transmission management apparatus 50.

If the determination result of step S87-4 is YES, the auxiliary area display unit 18 again displays the auxiliary area 173 based on the layout information 2000L stored in the RAM 103, in step S87-5. Thereby, if the number of bases has changed, the transmission terminal 10 can immediately reflect the changed number of bases in the auxiliary area 173.

If the determination result of step S87-4 is NO, the auxiliary area display unit 18 determines in step S87-6 whether the user has performed an operation to display the auxiliary area 173.

If the determination result of step S87-6 is YES, the auxiliary area display unit 18 displays the auxiliary area 173 based on the layout information 2000L stored in the RAM 103 in step S87-5. Thereby, the user can display the auxiliary area 173 at any timing.

If each of both the determination results of step S87-4 and step S87-6 is NO, the auxiliary area display unit 18 keeps not displaying the auxiliary area 173.

Thus, the auxiliary area 173 is displayed when the number of bases has changed. Therefore, the user can easily know that the number of bases has changed. Because the auxiliary area 173 is removed after the elapse of the certain period of time, the user can participate in the video conference while paying attention mainly to the images of the respective bases.

If the user wishes to know details of bases which have participated in the video conference as a result of knowing a change in the number of bases or knowing the number of bases, the user can switch the display mode into the information display mode. Because the user can switch the display mode into the information display mode when the number of bases has changed, the user need not switch the display mode into the information display mode to know the number of bases or the bases which have participated in the video conference.

The transmission terminals, the transmission management apparatuses, the programs, the transmission methods, and the transmission systems have been described in the embodiments. However, the present invention is not limited to the above-mentioned embodiments, and various modifications and improvements can be made within the scope of the present invention.

For example, the relay apparatuses 30, the transmission management apparatus 50 and the program providing apparatus 90 can be established by a single computer instead of being provided separately. Also, the respective elements and the storage units 1000, 2000, 3000, and 5000 of the relay apparatuses 30, the transmission management apparatus 50 and the program providing apparatus 90 can be freely assigned to a plurality of computers. In this case, the UI providing apparatus 20 can be included as a function of any one of the computers.

Also, as an example of quality of an image relayed by a relay apparatus 30, resolution of an image of image data is managed in the above-mentioned embodiments. However, what is managed is not limited to this example. As others example of quality to be managed, a depth of image quality of image data, a sampling frequency used when a sound is sampled to acquire sound data, a bit length in a sound of sound data, or the like, can be managed. Also, it is possible that sound data is transmitted and received in a manner that the sound data is separated into respective pieces that have 3 types of resolution (high resolution, medium resolution, and low resolution).

Also, in FIGS. 9A and 9B, the IP addresses of the transmission terminals 10 are managed. However, what is managed is not limited to IP addresses, and any other information for identifying the transmission terminals 10 in the transmission network 2 may be used. For example, FQDNs (Fully Qualified Domain Names) of the transmission terminals 10 may be managed. In this case, through a known DNS (Domain Name System) server, the IP addresses corresponding to the FQDNs are acquired.

Also, in the above-mentioned embodiments, a video conference system has been described as one example of the transmission system 1. However, the transmission system 1 is not limited to the video conference system. For example, the transmission system 1 may be a telephone system of IP (Internet Protocol) phones, internet phones or the like, or an interactive white board system.

Figure 27:
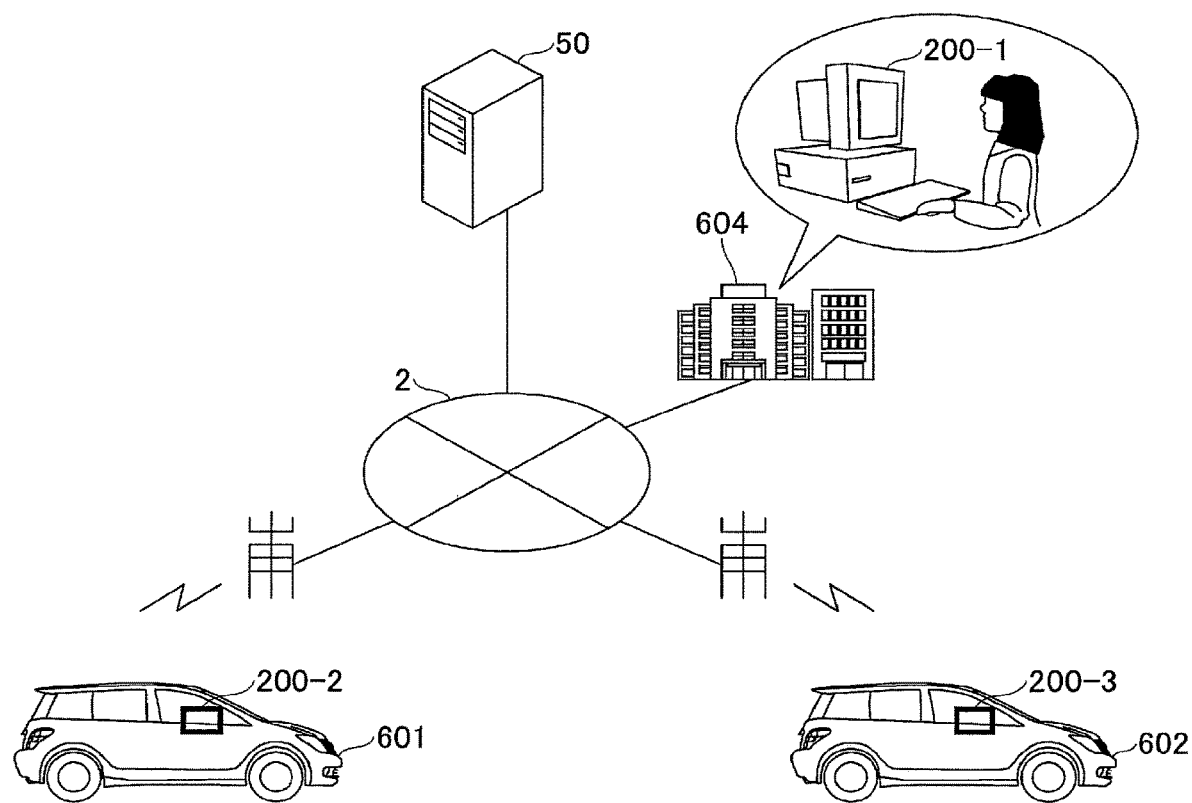
FIG. 27 illustrates one example of a system configuration in a case where a transmission terminal is applied as a car navigation apparatus.

Also, the transmission system 1 can be a system that includes car navigation apparatuses mounted in moving bodies, respectively. FIG. 27 illustrates one example of a system configuration in a case where transmission terminals 10 are applied as car navigation apparatuses 200-2 and 200-3 mounted in respective moving bodies (automobiles 601 and 602), respectively.

In this case, one transmission terminal 10 corresponds to the car navigation apparatus 200-2 mounted in the automobile 601. Another transmission terminals 10 corresponds to a management terminal 200-1 used by a communicator in a management center 604, or the car navigation apparatus 200-3 mounted in the automobile 602. The management terminal 200-1 and the car navigation apparatuses 200-2 and 200-3 are connected together via a network 2. Also, the management terminal 200-1 and the car navigation apparatuses 200-2 and 200-3 establish a session using a transmission management apparatus 50.

Figure 28:
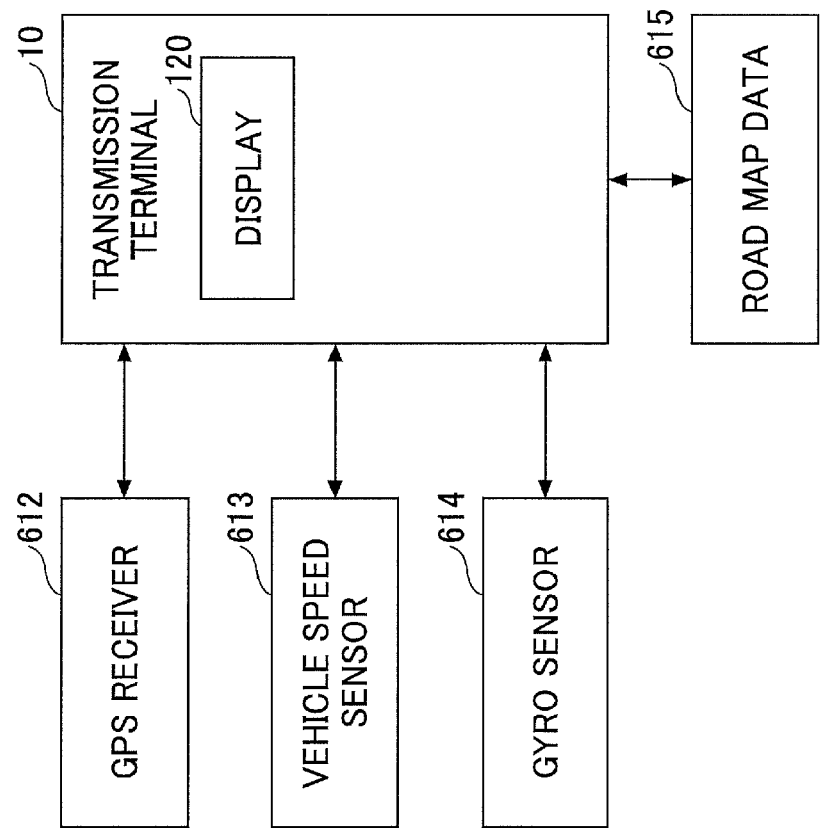
FIG. 28 illustrate one example of a configuration diagram of an in-vehicle car navigation apparatus.

FIG. 28 illustrates one example of a configuration diagram of any one of the in-vehicle car navigation apparatuses 200-2 and 200-3. The car navigation apparatus 200-2 has a configuration such that, to a transmission terminal 10 described above, a GPS receiver 612, a vehicle speed sensor 613, a gyro sensor 614, and a road map data 615 are connected. Also, the transmission terminal 10 includes a display 120 integrally. Note that the display 120 may be connected to the transmission terminal 10 in a wired manner or wirelessly, or may be detachable to and from the transmission terminal 10.

The transmission terminal 10 provides the function as any one of the car navigation apparatus 200-2 and 200-3 by executing a program. The GPS receiver 612 captures GPS satellite signals to output the coordinates of the current position. The vehicle speed sensor 613 detects the vehicle speed (i.e., the rotational speed of the wheels) of the vehicle 601 or 602. The gyro sensor 614 detects the angular velocity, and, as a result of integrating the angular velocity, it is possible to detect the direction in which the vehicle 601 or 602 travels.

The road map data 615 is data that expresses roads by combinations of nodes and links, and can be downloaded from the outside or can be previously held by the vehicle 601 or 602. The road map data is displayed on the display 120.

Note that a PC may be connected to the transmission terminal 10 for sharing screen pages. Also, the car navigation apparatus 200-2 or 200-3 may have, in addition to the configuration illustrated in FIG. 28, a tuner function to a receive radio or TV broadcasts, an audio function to reproduce music, a function to link with an in-vehicle camera such as a rearview camera, a browser function to display Web sites, and so forth.

The transmission terminal 10 estimates the position of the vehicle by applying autonomous navigation that accumulates travel distances detected by the vehicle speed sensor 613 in the travel direction detected by the gyro sensor 614 using the position information that is detected by the GPS receiver 612 as a starting point. The position of the vehicle is displayed in the road map in a form of a vehicle mark. Also, the transmission terminal 10 searches for a route for a destination and guides the vehicle driver with the searched route. Thus, the transmission terminal 10 implements the car navigation function.

The car navigation apparatuses 200-2 and 200-3 are connected to the network 20 through functions of the transmission terminals 10. For example, each transmission terminal 10 is connected to the network 2 using a cellphone via a cellphone network that may use wireless communications that mainly cover a wide area such as an outdoor area or the like using antenna power from a base station.

Figure 29:
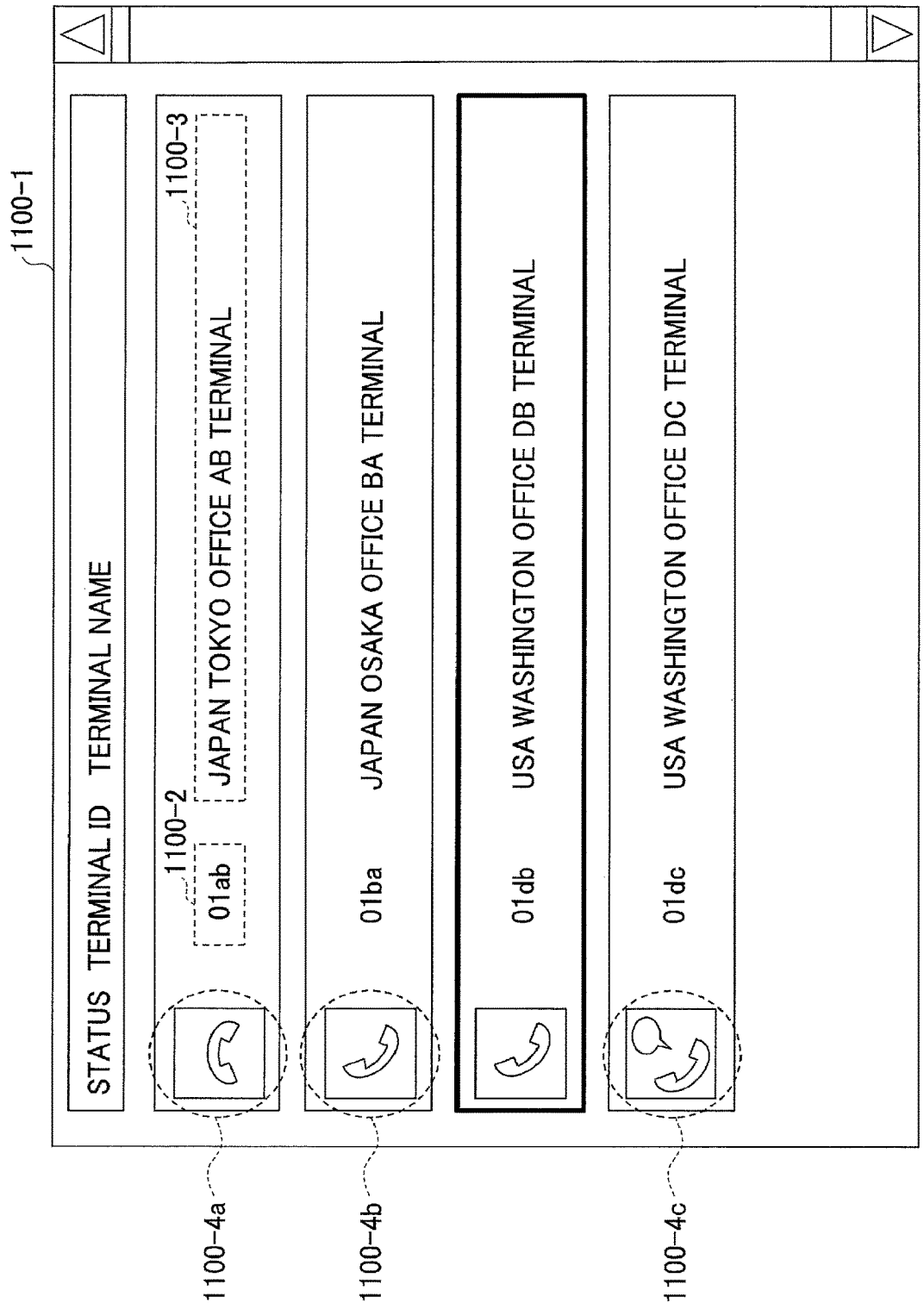
FIG. 29 illustrates one example of displaying a destination list displayed on the car navigation apparatus.

The transmission terminal 10 as the car navigation apparatus 200-2 or 200-3 displays a screen page of a destination list on the display 120 such as the destination list of FIG. 29. The destination list is a display screen page where, in a destination list frame 1100-1, terminal IDs 1100-2, terminal names 1100-3, and icons 1100-4*a* through 1100-4*c* representing status information of destination terminal candidates are included. The occupant selects a destination terminal from the list of destination terminals displayed on the display 120.

After a session is established with the destination terminal, the transmission terminal 10 (the car navigation apparatus 200-2 or 200-3) can transmit image data from a camera, voice data, and so forth to, and receive image data, voice data, and so forth from the selected destination terminal.

Also, as a result of the user (the occupant) performing an operation on the transmission terminal 10 (the car navigation apparatus 200-2 or 200-3), the transmission terminal 10 can acquire display data such as a road map, a TV picture, or the like. In this case, the car navigation apparatus 200-2 or 200-3 can transmit display data to the other car navigation apparatus that is the destination terminal connected via the network 2.

Also, if the user selects the management terminal 200-1 used by the communicator of the management center 604 from the list of the destination terminals, image data of the communicator is displayed on the display 120, and a voice of the communicator is output from the speaker. Thus, the user can perform a conversation with the communicator as a TV phone.

Thus, merely the mounting place becomes the moving body (the automobile, or the like), image data, voice data, and display data can be transmitted and received in a manner the same as or similar to a transmission terminal 10 in an office.

Also, in the above-mentioned embodiments, as an example of content data, image data and sound data are processed. However, content data is not limited to image data and sound data, and content data may be touch data. In this case, a feeling generated when a user touches one transmission terminal 10 is transmitted to another transmission terminal 10.

Also, content data may be smell data. In this case, a smell on the side of one transmission terminal is transmitted to another transmission terminal. Also, content data may be at least one of image data, sound data, touch data, and smell data.

Also, in the above-mentioned embodiments, the case where the transmission system 1 is used to carry out a video conference. However, actual applications of the transmission system 1 are not limited to this case. The transmission system 1 may be used for a meeting, a general conversation among family members, friends, or the like, or submitting information unidirectionally.

Thus, it is possible to provide a transmission terminal with which it is possible to know information of other bases even in an image mode where images from transmission terminals are displayed.

Thus, the transmission terminals, the transmission management apparatuses, the non-transitory recording media, the transmission methods, and the transmission systems have been described in the embodiments. However, embodiments are not limited to the above-described embodiments, and various modifications and replacements may be made.

What is claimed is:

1. A transmission terminal performing a video conference with a plurality of transmission terminals, the transmission terminal comprising:
   processor processing circuitry configured to
   display, on a screen of the transmission terminal, information concerning a total number of transmission terminals participating in the video conference, and display, on the screen of the transmission terminal, respective sets of image data transmitted by transmission terminals participating in the video conference to each other, wherein
   a number of the sets of image data, transmitted by transmission terminals participating in the video conference to each other, to display on the screen of the transmission terminal is smaller than the total number of transmission terminals participating in the video conference.

2. The transmission terminal according to claim 1, wherein
   the processing circuitry is configured to display information concerning names or identification information of transmission terminals performing the video conference.

3. A transmission terminal performing a video conference with a plurality of transmission terminals, the transmission terminal comprising:
   processing circuitry configured to display, on a screen of the transmission terminal, information concerning a total number of transmission terminals participating in the video conference, and display, on the screen of the transmission terminal, respective sets of image data transmitted by transmission terminals participating in the video conference to each other, wherein
   the total number of transmission terminals participating in the video conference is greater than a number of the sets of image data, transmitted by transmission terminals participating in the video conference to each other, to display on the screen of the transmission terminal.

4. A method implemented by a transmission terminal performing a video conference with a plurality of transmission terminals, method comprising:
   displaying on a screen of the transmission terminal, information concerning a total number of transmission terminals participating in the video conference, and displaying, on the screen of the transmission terminal, respective sets of image data transmitted by transmission terminals participating in the video conference to each other, wherein
   a number of the sets of image data, transmitted by transmission terminals participating in the video conference to each other, to display on the screen of the transmission terminal is smaller than the total number of transmission terminals participating in the video conference.

5. The method according to claim 4, further comprising:
   displaying information concerning names or identification information of transmission terminals performing the video conference.

6. A method implemented by a transmission terminal performing a video conference with a plurality of transmission terminals, the method comprising:
   displaying, on a screen of the transmission terminal, information concerning a total number of transmission terminals participating in the video conference, and displaying, on the screen of the transmission terminal, respective sets of image data transmitted by transmission terminals participating in the video conference to each other, wherein
   the total number of transmission terminals participating in the video conference is greater than a number of the sets of image data, transmitted by transmission terminals participating in the video conference to each other, to display on the screen of the transmission terminal.

* * * * *